US008065908B2

(12) United States Patent
Uchihashi et al.

(10) Patent No.: US 8,065,908 B2
(45) Date of Patent: Nov. 29, 2011

(54) SCAN TYPE PROBE MICROSCOPE

(75) Inventors: Takayuki Uchihashi, Ishikawa (JP);
Toshio Ando, Ishikawa (JP); Hayato Yamashita, Ishikawa (JP)

(73) Assignee: National University Corporation Kanazawa University, Ishikawa (JP)

( * ) Notice: Subject to any disclaimer, the term of this patent is extended or adjusted under 35 U.S.C. 154(b) by 723 days.

(21) Appl. No.: 12/096,449

(22) PCT Filed: Dec. 12, 2006

(86) PCT No.: PCT/JP2006/324723
§ 371 (c)(1),
(2), (4) Date: Jul. 21, 2008

(87) PCT Pub. No.: WO2007/072706
PCT Pub. Date: Jun. 28, 2007

(65) Prior Publication Data
US 2008/0307864 A1 Dec. 18, 2008

(30) Foreign Application Priority Data

Dec. 20, 2005 (JP) .................... 2005-366395

(51) Int. Cl.
*G01B 5/28* (2006.01)
(52) U.S. Cl. .......................... 73/105; 850/33
(58) Field of Classification Search .............. 73/105; 850/10, 33
See application file for complete search history.

(56) References Cited

U.S. PATENT DOCUMENTS

| 5,507,179 A * | 4/1996 | Gamble et al. ............. 73/105 |
| 6,073,485 A * | 6/2000 | Kitamura ................... 73/105 |
| 6,941,798 B2 * | 9/2005 | Yamaoka et al. ............ 73/105 |
| 7,250,602 B2 * | 7/2007 | Matsumoto et al. .......... 250/310 |
| 2007/0277599 A1 * | 12/2007 | Wang et al. ................ 73/105 |
| 2009/0139315 A1 * | 6/2009 | Wang et al. ................ 73/105 |

FOREIGN PATENT DOCUMENTS

| JP | 2000-146809 | 5/2000 |
| JP | 2001-183458 | 7/2001 |

OTHER PUBLICATIONS

International Search Report Dated Mar. 20, 2007.
(Continued)

*Primary Examiner* — Daniel Larkin
(74) *Attorney, Agent, or Firm* — Pearne & Gordon LLP

(57) ABSTRACT

Provided is an atomic force microscope capable of increasing the phase detection speed of a cantilever vibration. The cantilever (5) is excited and the cantilever (5) and a sample are relatively scanned. Displacement of the cantilever (5) is detected by a sensor. An oscillator (27) generates an excitation signal of the cantilever (5) and generates a reference wave signal having a frequency based on the excitation signal and a fixed phase. According to vibration of the cantilever (5), a trigger pulse generation circuit (41) generates a trigger pulse signal having a pulse position changing in accordance with the vibration of the cantilever (5). According to the reference wave signal and the trigger pulse signal, a phase signal generation circuit (43) generates a signal corresponding to the level of the reference wave signal at the pulse position as a phase signal of vibration of the cantilever (5). As the reference wave signal, a saw tooth wave is used. A phase signal generation circuit (43) is formed by a sample hold circuit.

9 Claims, 12 Drawing Sheets

OTHER PUBLICATIONS

M. Stark and R. Guckenberger; "Fast low-cost phase detectionsetup for tapping-mode atomic force microscopy"; Review Ofscientific Instruments; vol. 70, No. 9, Sep. 24, 1999, p. 3614-3619.

Miriam Araman, Roxana Golan, Neil H. Thomson and Helen G. Hansma; "Phase imaging of moving DNA molecules and DNA molecules replicated in the atomic force microscope", Nucleic Acids research, 1997, vol. 25, No. 21, p. 4379-4384.

* cited by examiner

PROBE-SAMPLE DISTANCE

SCAN TYPE PROBE MICROSCOPE

TECHNICAL FIELD

The present invention relates to a scanning probe microscope and in particular relates to technology for detecting the phase of oscillation of a cantilever.

BACKGROUND ART

Typical known scanning probe microscopes (SPMs) are a scanning tunneling microscope (STM) and an atomic force microscope (AFM). Of these, an AFM comprises a cantilever having a probe at its free end, a displacement sensor for detecting displacement of the cantilever, and a sample stage scanner.

In an AFM, a cantilever is oscillated with a frequency in the vicinity of its resonant frequency by oscillating a piezoelectric element (piezo element), and a probe of this oscillating cantilever is brought into contact with a sample. The sample and the cantilever are relatively scanned in the XY direction and the amplitude of oscillation is detected using a displacement sensor during the XY scanning process. Further, the sample and the cantilever are relatively scanned in Z direction (vertical direction) through feedback process so as to maintain a fixed oscillation amplitude. The variation in height of the sample surface is acquired by the feedback scanning and the shape of the sample can thereby be measured. Thus, in an AFM, the sample shape is measured by detecting with a displacement sensor the variation of oscillation amplitude produced by contact between the sample and the probe.

In an AFM, apart from oscillation amplitude, "phase" is also measured as useful information. It is known that the phase of cantilever oscillation is shifted by the interactions accompanying the energy dissipation of the sample and the probe. The phase information includes physical properties information such as the viscosity, elasticity and composition of the sample. It is therefore possible to follow not merely changes in the structure of living bodies' molecules, but also dynamic changes in physical properties information, by detecting phase change. Phase measurement using an AFM is disclosed in, for example, Miriam Argaman et al., "Phase imaging of moving DNA molecules and DNA molecules replicated in the atomic force microscope", Nucleic Acids Research, Oxford University Press, 1997, Volume 25, No. 21, pp. 4379-4384.

In a conventional AFM, for example a lock-in amplifier is employed for phase detection. However, a lock-in amplifier does not have sufficient bandwidth such as is required for high-speed AFM measurement. For example, a lock-in amplifier cannot cope with demands for detecting the phase of cantilever oscillation in each individual cycle period. Phase detection technology of higher speed is therefore required.

Also, apart from contact AFMs, non-contact AFMs are known as the AFMs. A non-contact AFM is employed under the condition in which the probe is close to the sample. The problems concerning efficiency of excitation described above are not restricted to contact AFMs. The same problems also occur with non-contact AFMs.

DISCLOSURE OF THE INVENTION

Problem that the Invention is to Solve

The present invention was made under the above background, and an object of the present invention is to provide a scanning probe microscope capable of high-speed detection of the phase of cantilever oscillation.

Also, one object of the present invention is to provide a scanning probe microscope whereby phase detection can be performed with high sensitivity.

In addition, one object of the present invention is provide a scanning probe microscope capable of performing feedback scanning and shape measurement by using phase change, which is of high sensitivity, and whereby sample damage can be reduced.

One object of the present invention is to provide a scanning probe microscope wherein further increase of the number of measurement points can be achieved by utilizing high-speed phase detection.

Means for Solving the Problems

A scanning probe microscope of the present invention oscillates a cantilever and performs relative scanning between the cantilever and a sample. This scanning probe microscope comprises: exciting means for exciting the cantilever; a sensor for detecting displacement of the cantilever; reference wave generating means for generating a reference wave signal that has a frequency determined on the basis of an excitation signal of the cantilever and is of fixed phase difference with respect to the excitation signal; trigger pulse generating means for generating a trigger pulse signal whose pulse position changes dependent on the phase of oscillation of the cantilever, on the basis of the displacement of the cantilever; and phase signal generating means for generating, as the phase signal of the cantilever oscillation, a signal dependent on the magnitude of the reference wave signal at the pulse position, on the basis of the reference wave signal and the trigger pulse signal.

As described above, in the present invention, the phase of cantilever oscillation can be detected by comparing a reference wave signal of fixed phase with a trigger pulse signal whose pulse position changes depending on the phase of the cantilever oscillation. The magnitude of the reference wave signal at the pulse position of the trigger pulse signal corresponds to the phase of the cantilever. The phase can be detected with a speed corresponding to the frequency of the reference wave signal, therefore, phase detection can be performed with high-speed.

The reference wave generating means may generate a signal having the same frequency as the excitation signal and of fixed phase difference with respect to the excitation signal as the reference wave signal; and the trigger pulse generating means may generate, as the trigger pulse signal, a pulse signal that expresses the position on a time axis of the oscillation waveform obtained from the displacement of the cantilever. Therefore, phase detection can be performed in each cycle of the cantilever oscillation, so high-speed phase detection can be achieved.

The trigger pulse generating means may generate a trigger pulse signal at a position on the oscillation waveform corresponding to the timing of contact or closest approach of the cantilever to the sample. The trigger pulse signal may be generated at the timing of contact of the cantilever with the sample in the case of a contact AFM, or may be generated at the timing of closest approach of the cantilever to the sample in the case of a non-contact AFM. It is considered that the phase change is most marked at the timing with which the cantilever contacts the sample or makes closest approach thereto. The phase change is therefore suitably detected by generating a trigger pulse with the timing of contact or closest approach of the cantilever to the sample. Specifically, the timing with which the cantilever contacts or makes closest approach to the sample corresponds to the lowest point in the Z direction of the oscillation waveform. Therefore, in the present invention, signal processing may be performed such that a pulse generated in the vicinity of this lowest point. For this processing, a phase shifter is suitably employed in the embodiment described below.

Also, the reference wave generating means may generate a sawtooth wave signal as the reference wave signal. The sawtooth wave is a wave that changes monotonically during a single period of the reference wave signal. The phase can suitably be detected by comparing the sawtooth wave and the trigger pulse.

There may be provided an oscillator having a plurality of channels, and the oscillator may generate the excitation signal of the exciting means and generate the reference wave signal as the reference wave generating means. For example, a two-channel oscillator may generate an excitation signal and a reference wave signal. A suitable reference wave signal can easily be generated.

Also, the trigger pulse generating means may include: a bandpass filter for extracting an oscillation waveform signal of a frequency component of the excitation signal from a displacement signal of the cantilever; a comparator for converting the oscillation waveform signal to a rectangular wave signal; and a differentiator for generating a pulse signal at the rectangular wave generation timing from the rectangular wave signal. A suitable trigger pulse signal can be generated by an appropriate circuit configuration.

Also, the phase signal generating means may include a sample-hold circuit that holds the reference wave signal using the trigger pulse signal as sampling timing. The phase signal may suitably be generated by sample-holding.

Also the cantilever may be a micro cantilever of length no more than 10 µm and of width no more than 2 µm. Preferably the cantilever has a length of no more than 10 µm but at least 5 µm, and a width of no more than 2 µm but at least 1 µm. Sensitive phase detection can be achieved by employing a microcantilever.

Also, in the scanning probe microscope, the sample and the cantilever may be relatively scanned in a Z direction such that the phase signal generated by the phase signal generating means is constant. The scanning probe microscope may determine the shape of the sample by specifying the position of the sample in the Z direction from the signal for controlling the phase signal to be constant. The Z direction is the direction of surface unevenness of the sample (more precisely, the height direction of surface unevenness). The position of the sample in the Z direction represents the height of surface unevenness of the sample.

In such configuration, feedback scanning is performed and, furthermore, shape measurement is performed, using the change of phase dependent on distance between the cantilever and the sample. Since, as described above, the phase is detected at high speed, feedback scanning using phase becomes possible and shape measurement can also become possible.

Also, in phase detection of the present invention, phase can be detected at high speed corresponding to the frequency of the reference wave signal: for example, detection once per oscillation period of the cantilever can be achieved. Consequently, phase detection of the present invention can be performed at even higher speed than amplitude detection: thus, increase in the speed of feedback scanning and shape measurement, together with improved resolution can be achieved.

Also, according to the investigations of the present inventors, when a micro cantilever is employed, even in liquid, the phase responds well to the distance between the probe and sample, the phase sensitivity is high, and in fact the phase sensitivity tends to be higher than the amplitude sensitivity. Consequently, when feedback scanning is performed using phase, high sensitivity shape measurement can be achieved. Furthermore, it is possible to arrange the cantilever further away from the sample, thereby reducing the load on the sample, and making it possible to perform measurements in a condition where the probe-sample interaction is weak, thereby reducing damage to the sample surface. Thus, feedback scanning and shape measurement can be achieved preferably using phase.

The trigger pulse generating means may generate a plurality of trigger pulse signals that are offset to each other in one period of the reference wave signal; and the phase signal generating means may generate the phase signal from each of the plurality of trigger pulse signals. Therefore, the number of phase detection points can be further increased, and high-speed detection can be achieved. Increase of bandwidth when phase is employed for feedback scanning also becomes possible.

The phase signal generating means may include a plurality of sample-hold circuits that hold the reference wave signal using the trigger pulse signals as sampling timing, and the plurality of trigger pulse signals are respectively input to the plurality of sample-hold circuits, whereby the phase detection points can be suitably increased.

The scanning probe microscope may include means for offsetting a plurality of phase signals generated by the plurality of sample-hold circuits dependent on the offset of the plurality of trigger pulse signals, whereby the phase detection points can be suitably increased.

The scanning probe microscope may include means for generating a plurality of reference wave signals that are offset to each other dependent on the offset of the trigger pulse signals, and the plurality of reference wave signals may be respectively input together with the plurality of trigger pulse signals to the plurality of sample-hold circuits, whereby the phase detection points can be suitably increased.

In another aspect of the present invention, a scanning probe microscope comprises: a cantilever; an oscillator for causing the cantilever to oscillate; a sensor for detecting displacement of the cantilever; a reference wave generating circuit for generating a reference wave signal that has a frequency based on an excitation signal of the cantilever and is of fixed phase difference with respect to the excitation signal; a trigger pulse generating circuit for generating a trigger pulse signal whose pulse position changes dependent on the phase of oscillation of the cantilever, on the basis of the displacement of the cantilever; and a phase signal generating circuit for generating, as the phase signal of the cantilever oscillation, a signal dependent on the magnitude of the reference wave signal at the pulse position, on the basis of the reference wave signal and the trigger pulse signal. The same advantages are obtained by this configuration also.

Another aspect of the present invention is a cantilever phase detection device that is used in a scanning probe microscope for oscillating a cantilever and performing relative scanning between the cantilever and a sample, and that detects the phase of oscillation of the cantilever, the device comprising: reference wave generating means for generating a reference wave signal that has a frequency based on an excitation signal of the cantilever and is of fixed phase difference with respect to the excitation signal; trigger pulse generating means for generating a trigger pulse signal whose pulse position changes dependent on the phase of oscillation of the cantilever, on the basis of the displacement of the cantilever; and a phase signal generating circuit for generating, as the phase signal of the cantilever oscillation, a signal dependent on the magnitude of the reference wave signal at the pulse position, on the basis of the reference wave signal and the trigger pulse signal. The same advantages are obtained by this configuration also.

Another aspect of the present invention is a cantilever phase detection method that is used in a scanning probe microscope for oscillating a cantilever and performing relative scanning between the cantilever and a sample, and that detects the phase of the cantilever, said method comprising: generating a reference wave signal that has a frequency based on an excitation signal of said cantilever and is of fixed phase difference with respect to said excitation signal; generating a trigger pulse signal whose pulse position changes dependent on the phase of oscillation of said cantilever, on the basis of the displacement of said cantilever; and generating, as a phase signal of said cantilever oscillation, a signal dependent on the magnitude of said reference wave signal at said pulse position, on the basis of said reference wave signal and said trigger pulse signal. The same advantages are obtained by this method also.

Advantage of the Invention

In accordance with the present invention, phase detection can be performed at high-speed by employing a reference wave signal of fixed phase and a trigger pulse signal whose pulse position changes dependent on the phase of oscillation of a cantilever.

As described hereafter, other aspects of the invention exist. Thus, this disclosure of the invention is intended to provide a few aspects of the invention and is not intended to limit the scope of the invention described and claimed herein.

BEST MODE FOR CARRYING OUT THE INVENTION

A detailed explanation of the invention will be hereinafter described. The detailed explanation and the accompanying drawings do not limit the invention. Instead, the scope of the invention is limited by claims attached hereto. An embodiment of the present invention is described below with reference to the drawings.

In this embodiment, the present invention is applied to an atomic force microscope (AFM).

First Embodiment

Technology for Increasing the Speed of Phase Detection

Figure 1:
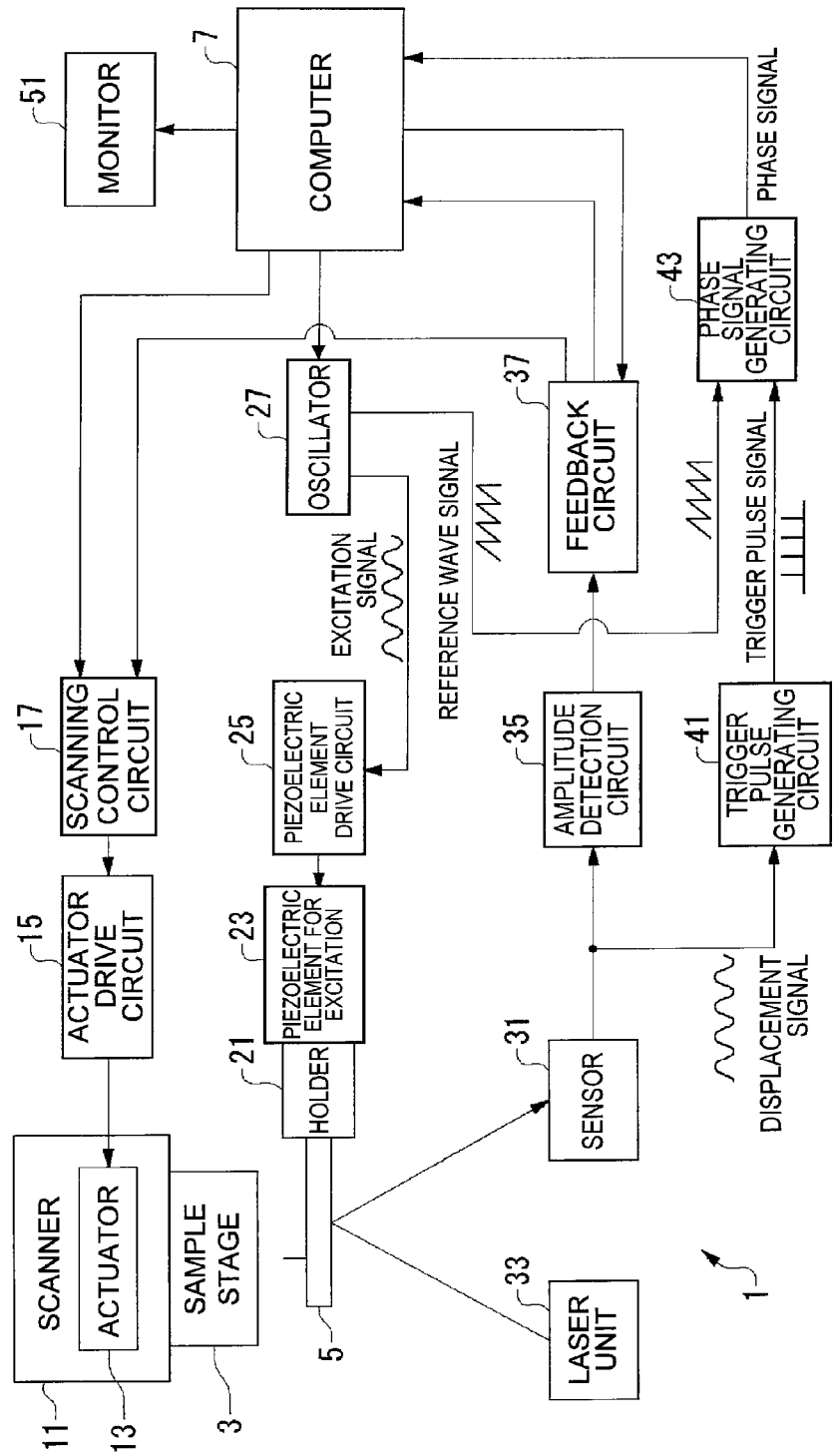
FIG. 1 is a block diagram of atomic force microscope (AFM) according to an embodiment of the present invention.

FIG. 1 shows the configuration of an AFM according to a first embodiment. The overall configuration of the AFM 1 comprises: a sample stage 3; a cantilever 5; configuration for scanning the sample stage 3 in the XYZ directions; configuration for oscillating cantilever 5 with a frequency in the vicinity of the resonant frequency; configuration for detecting displacement of the cantilever 5; configuration for feedback scanning that detects the amplitude of oscillation of the cantilever 5 and maintain a fixed amplitude; configuration for detecting the phase of oscillation of the cantilever 5; and a computer 7 controlling the overall configuration.

The sample stage 3 is configured to hold a sample at its lower surface. The sample stage 3 is mounted on a scanner 11, and this scanner 11 comprises an actuator 13. The actuator 13 is constructed by a piezoelectric element (piezo element) that performs relative scanning between the sample with respect to the cantilever 5 by moving the sample stage 3 in the X, Y and Z directions. In FIG. 1, the X and Y directions are mutually orthogonal directions in the horizontal plane, and the Z direction is the vertical direction. The Z direction is the surface unevenness direction (height direction) of the sample. The actuator 13 is driven by an actuator drive circuit 15, the actuator drive circuit 15 being controlled by a scanning control circuit 17.

The cantilever 5 is made of silicon nitride and has a probe at its free end. In this embodiment, the cantilever 5 is a micro cantilever. A micro cantilever is a cantilever that is much smaller than a standard cantilever, having a size of no more than one-tenth of that of an ordinary cantilever. Specifically, a standard cantilever may have for example a length of about 100 μm and a width of about 20 μm. In contrast, a micro cantilever may have a length of 10 μm or less, and a width of 2 μm or less. Preferably the micro cantilever has a length of no more than 10 μm but at least 5 μm and a width of no more than 2 μm but at least 1 μm. In the example of FIG. 1, the cantilever 5 has a rectangular shape, with a length of about 7 μm and a width of about 1 μm.

The cantilever 5 is held by a holder 21. The holder 2L is provided together with a piezoelectric element 23 (typically a piezo element) for excitation; the piezoelectric element 23 for excitation is driven by means of a piezoelectric element drive circuit 25.

The oscillator 27 is a sine wave oscillator that is controlled by the computer 7 to generate an excitation signal. In accordance with the excitation signal supplied from the oscillator 27, the piezoelectric element drive circuit 25 oscillates the exciting piezoelectric element 23, and therefore oscillates the cantilever 5.

In this embodiment, the oscillator 27 is a multi-channel type oscillator, and, more specifically, is a two-channel type oscillator. The oscillator 27 generates an excitation signal, which is output from one of the channels. In addition, the oscillator 27 generates a reference signal for phase detection, which is output from the other channel, and thereby can function as a reference wave generating circuit or means of the present invention. Phase detection using a reference wave signal is described in detail later.

A sensor 31 constitutes an optical lever type displacement sensor together with the laser unit 33. The laser unit 33 irradiates laser light onto the cantilever 5. The laser light is reflected by the cantilever 5, reaching the sensor 31. The sensor 31 is constituted by a photodiode and outputs a signal representing the displacement of the cantilever 5. The configuration of the optical system such as the lenses etc associated with the sensor is omitted in the figure.

In order to perform feedback scanning, the AFM 1 comprises an amplitude detection circuit 35 and a feedback circuit 37. The amplitude detection circuit 35 determines the amplitude of the cantilever 5 by processing the displacement signal that is input from the sensor 31.

The detected amplitude value is output to the feedback circuit 37. Also, an amplitude target value is input from the computer 7 to the feedback circuit 37. The feedback circuit 37 comprises a subtractor that generates a deviation signal by subtracting the amplitude target value from the detected amplitude value and a PID circuit that amplifies the deviation signal, whereby these elements generate a feedback signal. The amplitude target value of the feedback scanning is supplied from the computer 7. This amplitude target value may be set manually using for example a suitable circuit configuration.

The feedback signal is supplied to the scanning control circuit 17 and is utilized for feedback scanning. Also, the feedback signal is supplied to the computer 7, where it is employed in processing to generate an image of the sample.

Also, as a characteristic feature of this embodiment, the AFM 1 comprises a trigger pulse generating circuit 41 and a phase signal generating circuit 43 for detecting the phase of the cantilever 5 based on the displacement signal detected by the sensor 31. The configuration of these will be described in detail later.

The computer 7 controls the AFM 1 as a whole. The computer 7 is also provided with a computer interface function whereby various types of user instructions may be input to the computer 7 and the computer 7 controls the AFM 1 in accordance with this user input. Also, the computer 7 generates an image of the sample surface and outputs this to a monitor 51. In addition, the computer 7 generates an image of the phase change of oscillation of the cantilever 5 and outputs this to the monitor 51.

Next, the operation of the AFM 1 will be described. The scanning control circuit 17 is supplied with a control signal for scanning in the XY direction from the computer 7. The scanning control circuit 17 controls the actuator drive circuit 15 in accordance with the control signal so that scanning in the XY direction is performed by the actuator 13. Also, the computer 7 supplies instruction values for the strength of excitation (i.e. the amplitude) to the oscillator 27. The oscillator 27 generates an excitation signal under the control of the computer 7, and supplies this excitation signal to the piezoelectric element drive circuit 25. The piezoelectric element drive circuit 25 drives the piezoelectric element 23 for excitation, causing the cantilever 5 to oscillate with a frequency in the vicinity of the resonant frequency. Thus, the cantilever 5 and the sample are relatively scanned in the XY direction while the cantilever 5 oscillating.

During XY scanning, displacement of the cantilever 5 is detected by the sensor 31, and the amplitude of the cantilever 5 is determined by the amplitude detection circuit 35. The feedback circuit 37 then generates a feedback signal depending on the difference between the detected amplitude value and the amplitude target value, by using the amplitude target value supplied from the computer 7. The feedback signal is supplied to the scanning control circuit 17 and the scanning control circuit 17 controls the actuator drive circuit 15 in accordance with the feedback signal such that the detected amplitude value and the amplitude target value coincide. The distance between the cantilever 5 and the sample is maintained constant by means of this feedback control.

Thus, XY scanning is performed while performing Z scanning maintaining the distance between the cantilever 5 and the sample constant. The feedback signal of Z scanning is also supplied to the computer 7 from the feedback circuit 37. The feedback signal corresponds to the height of the sample in the Z direction. Also, the position in the XY direction on the sample is specified by the control signal of XY scanning that is generated by the computer 7 to be supplied to the scanning control circuit 17. The computer 7 generates an image of the sample surface based on the control data of the XY scan and the input feedback signal and displays the image on the monitor 51. A three-dimensional image is preferably generated and displayed.

Next, a configuration and method for detection of the phase of oscillation of the cantilever 5 that are characteristic of the present embodiment will be described. As already described, in FIG. 1, the oscillator 27 generates an excitation signal for exciting the cantilever 5 and generates a reference wave signal for phase detection in the present embodiment. Also, in this embodiment, there are provided a trigger pulse generating circuit 41 and phase signal generating circuit 43 for phase detection purposes.

Figure 2:
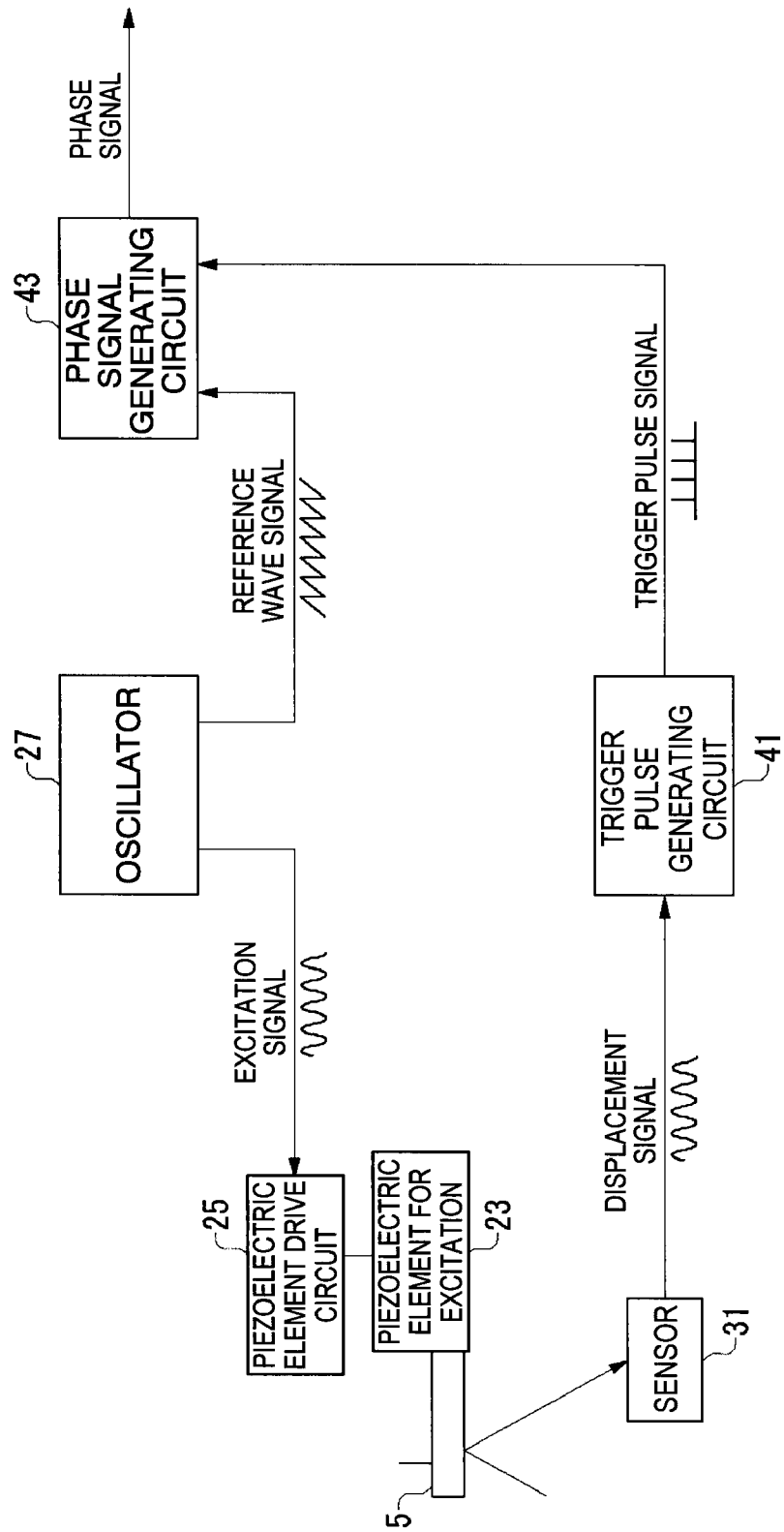
FIG. 2 shows the configuration of a phase detector in an AFM according to this embodiment.

FIG. 2 shows the above configuration for phase detection more specifically. The oscillator 27 is a multi-channel type oscillator, more specifically, it is a two-signal type oscillator (two-channel type oscillator). The oscillator 27 generates an excitation signal for exciting the cantilever 5 and outputs this from one channel to the piezoelectric element drive circuit 25. In addition, the oscillator 27 generates a reference wave signal for phase detection and outputs this from the other channel to the phase signal generating circuit 43, thus, the oscillator 27 can also function as a reference wave generating circuit or means of the present invention.

Whereas the excitation signal is a sine wave, the reference wave signal is a sawtooth wave. The frequency of the reference wave signal is the same as the excitation frequency of the excitation signal. Also, the phase difference of the reference wave signal and the excitation signal is fixed. This phase difference may be "0".

The trigger pulse generating circuit 41 is inputted with the signal of displacement of the cantilever 5 from the sensor 31. This displacement signal expresses the oscillation waveform of the cantilever 5. The trigger pulse generating circuit 41 generates a trigger pulse signal based on the displacement of the cantilever 5. The trigger pulse signal is a pulse signal whose pulse position changes dependent on the phase of the oscillation of the cantilever 5. More specifically, the trigger pulse generating circuit 41 generates as a trigger pulse signal a pulse signal representing the position on the time axis of the oscillation waveform obtained from the cantilever displacement. The pulse signal is generated in each period of the oscillation.

The phase signal generating circuit 43 is inputted with the reference wave signal and trigger pulse signal. The phase signal generating circuit 43 generates the phase signal of oscillation of the cantilever 5 based on the reference wave signal and the trigger pulse signal.

Figure 3:
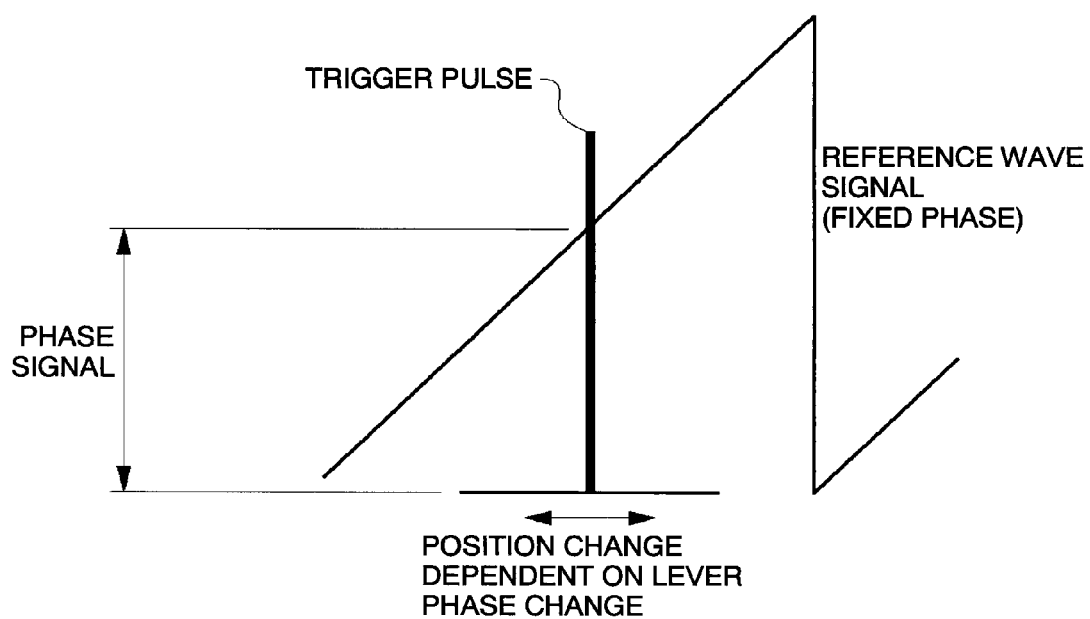
FIG. 3 shows phase signal generation processing.

As shown in FIG. 3, the reference wave signal is fixed in phase. In contrast, the phase of the trigger pulse signal changes depending on the phase of oscillation of the cantilever 5. Consequently, the magnitude of the reference wave signal at the pulse position corresponds in one-to-one correspondence with the oscillation phase of the cantilever 5. The phase signal generating circuit 43 accordingly generates, as a phase signal of the oscillation of the cantilever 5, a signal dependent on the magnitude of the reference wave signal at the pulse position. The phase signal generating circuit 43 can be realized by a sample-hold circuit as specifically described later.

In FIG. 3, the trigger pulse signal is the signal that changes in the vicinity of the middle of one period of the sawtooth wave of the reference wave signal. The phase of the reference wave signal is set such that the trigger pulse signal changes at such a position. As in this example, the phase of the reference wave signal is set such that the trigger pulse position changes in a range of single period of the reference wave signal. In order to carry out such trigger pulse positioning, the phase difference of the excitation signal and the reference wave signal at the oscillator 27 is suitably adjusted.

The phase signal generating circuit 43 supplies a phase signal to the computer 7. In the computer 7, phase mapping is performed and an image of the phase distribution is thereby generated. The phase signal represents phase change on the sample. The position in the XY direction on the sample is specified by a control signal for XY scanning generated by the computer 7 and supplied to the scanning control circuit 17. The computer 7 generates an image of the distribution of phase change by mapping the phase change on the sample using the XY scanning control data and the input phase signal and displays this image on the monitor 51. The phase change distribution image represents the elasticity distribution of the sample.

Figure 4:
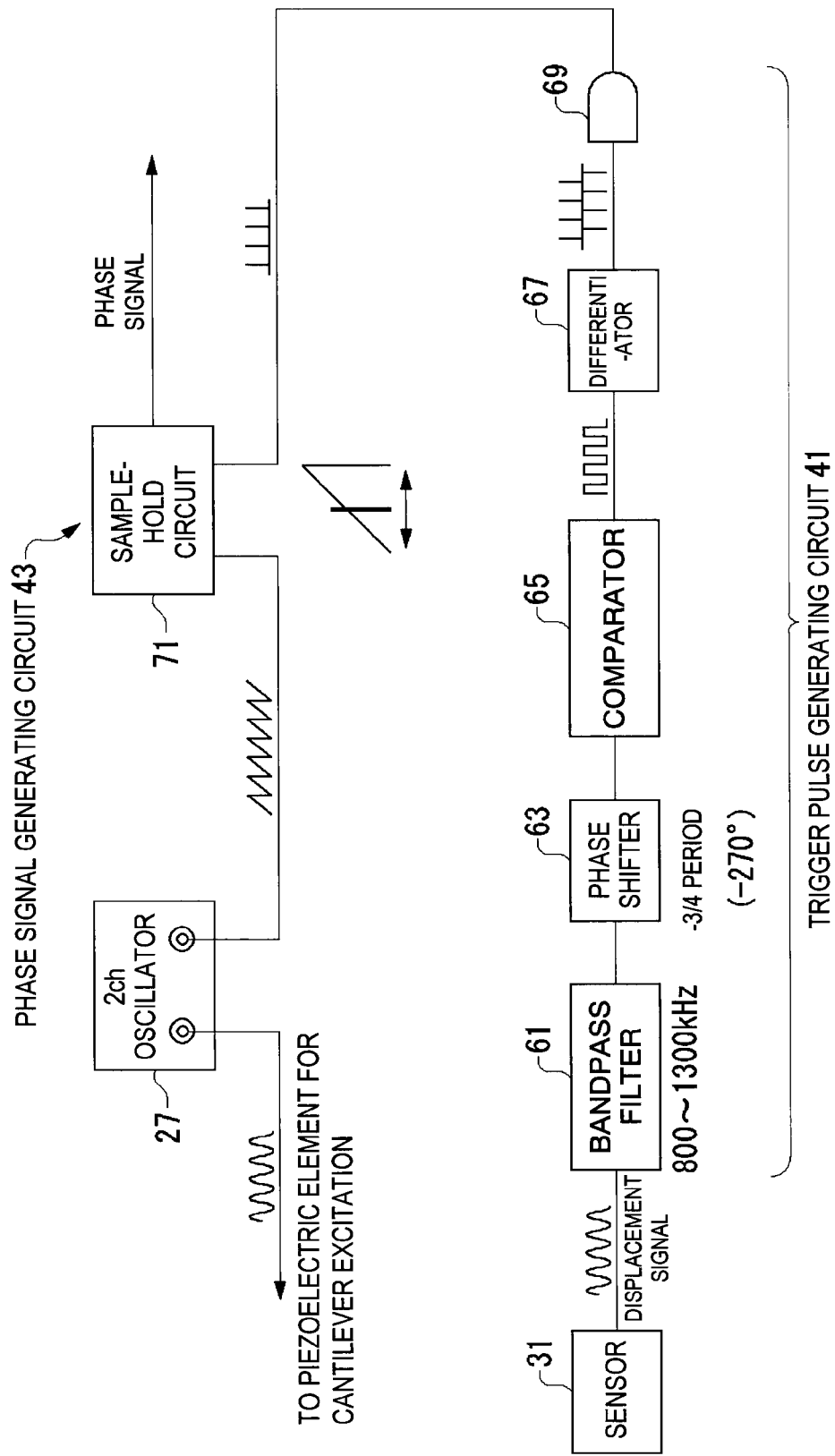
FIG. 4 shows the configuration of a phase detection circuit in an AFM according to this embodiment.

FIG. 4 shows the circuit configuration of the above phase detection more specifically. As shown in FIG. 4, the trigger pulse generating circuit 41 comprises a bandpass filter 61, a phase shifter 63, comparator 65, a differentiator 67 and an AND circuit 69.

The bandpass filter 61 extracts a signal of the excitation frequency component of the cantilever 5 from the displacement signal of the cantilever 5. The pass band of the bandpass filter 61 may be for example 800 kHz to 1300 kHz. In this way, the oscillation waveform signal of the excitation frequency component is obtained. The phase shifter 63 shifts the phase of the oscillation waveform signal. Phase detection can be performed at an arbitrary position of the cantilever oscillation by providing the phase shifter 63. In this embodiment, the phase is preferably offset by ¾ of the period of the excitation signal. The phase shifter 63 may delay the phase by 270° or may advance the phase by 90°. The function of the phase shifter 63 will be described later.

The comparator 65 converts the oscillation waveform signal to a rectangular wave signal. Specifically, the comparator 65 outputs a signal of a prescribed value when the amplitude value of the oscillation waveform signal is positive. Consequently, the value of the rectangular wave signal assumes a prescribed value when the amplitude value is positive and is "0" when the amplitude value is negative. Thus the rectangular wave signal is a signal that represents the period where the amplitude value is positive. The amplitude information is lost in the rectangular wave signal, but the phase information is preserved.

The differentiator 67 generates a pulse signal of the timing of generation of the rectangular wave from the rectangular wave signal. The differentiator 67 detects change of a signal. When the rectangular wave signal is passed to the differentiator 67, pulse signals are generated at the beginning (rise) and at the end of the rectangular wave. A positive pulse is generated at the beginning of the rectangular wave and a negative pulse is generated at the end of the rectangular wave. Of these, the positive pulse is the timing of the generation of the rectangular wave. Accordingly, these pulse signals are supplied to the AND circuit 69 from the differentiator 67 and only the positive pulse is output by the AND circuit 69.

Thus, the trigger pulse signal is generated. The position of the trigger pulse signal changes depending on the position on the time axis of the rectangular wave i.e. depending on the phase of the oscillation waveform.

The trigger pulse signal is supplied to the sample-hold circuit 71 from the AND circuit 69. In addition, the sample-hold circuit 71 is inputted with a reference wave signal from the oscillator 27. The sample-hold circuit 71 holds the reference wave signal, using the trigger pulse signal as sampling timing.

As shown in FIG. 3, the reference wave signal is a sawtooth wave, so the reference wave signal increases monotonically during a single period: more specifically, the reference wave signal increases linearly. Consequently, when the position of the trigger pulse changes depending on the phase of cantilever oscillation, the output of the sample-hold circuit 71 changes depending on the change of pulse position. Therefore, the output of the sample-hold circuit 71 is obtained as a phase signal.

As already described, in the configuration of FIG. 4, a phase shifter 63 is provided, and phase can be detected at an arbitrary position of the cantilever oscillation. In this embodiment, the phase of the oscillation waveform is preferably shifted by ¾ of the period of the excitation signal. The reasons for this are described below.

The comparator 65 generates a rectangular wave at the zero-cross point where the amplitude of the oscillation waveform changes from negative to positive. In the circuit of FIG. 4, a trigger pulse signal is generated at the zero-cross point. If phase shifter 63 is not provided, the trigger pulse signal is generated at the center of the oscillation amplitude of the cantilever 5.

However, in this embodiment, the phase shifter 63 is provided and shift the phase of the oscillation waveform is shifted by ¾ of the period. Consequently, the minimum portion (valley bottom portion) of the oscillation waveform of the cantilever 5 is shifted towards the zero-cross point (point where the amplitude changes from negative to positive). As a result, a trigger pulse signal is generated at the minimum point portion of the original oscillation waveform.

Figure 5:
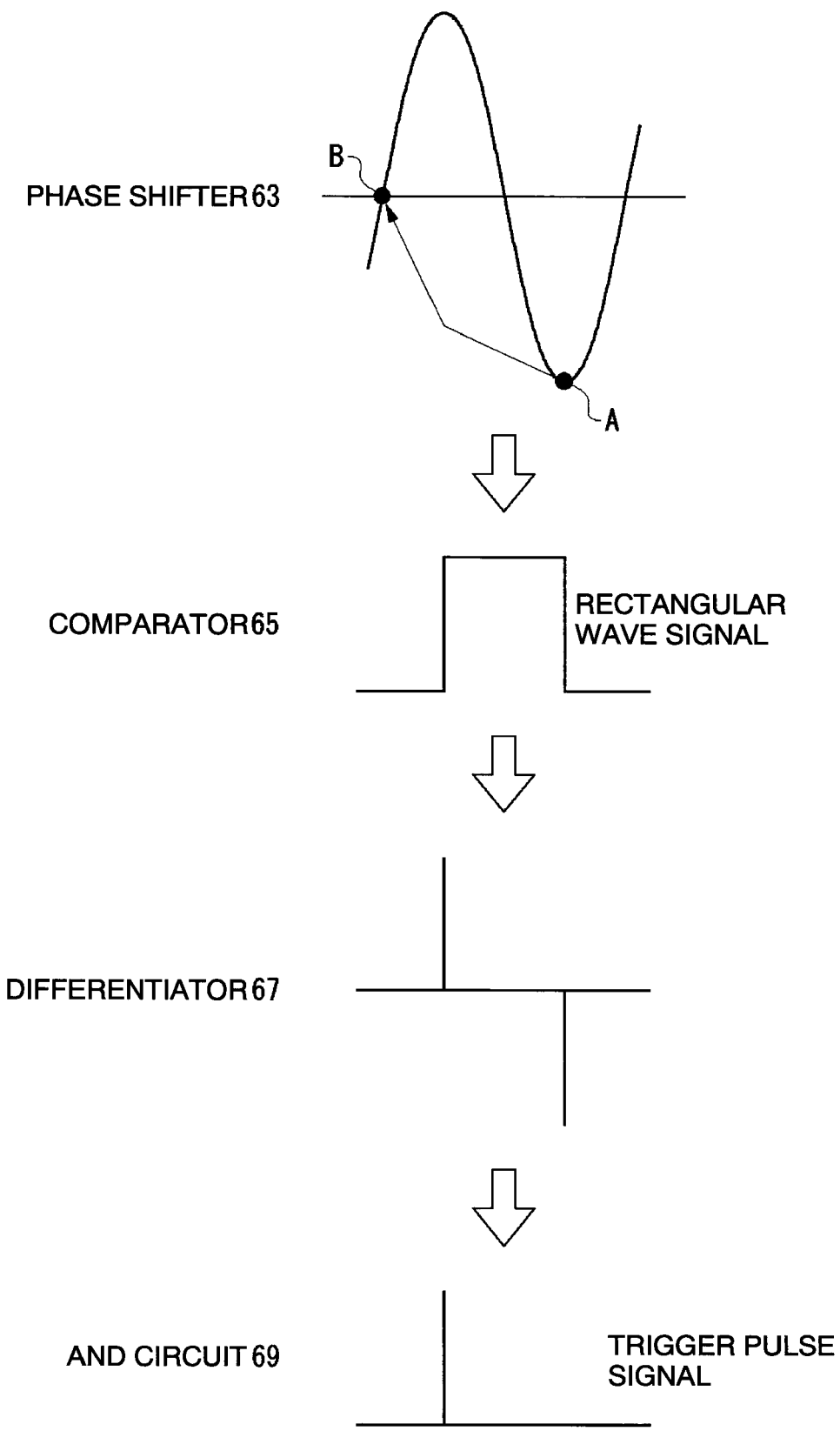
FIG. 5 shows the function of a phase shifter in a trigger pulse generating circuit in a phase detector.

FIG. 5 shows the function of the phase shifter 63. The minimum point "A" of the original oscillation waveform is shifted towards the zero-cross point "B" due to the phase shift. The comparator 65 then generates a rectangular signal in the period where the amplitude is positive. The differentiator 67 generates a positive pulse and a negative pulse at the beginning and the end of the rectangle. The AND circuit 69 preserves the positive pulses. Thus, a trigger pulse signal is generated at the minimum point portions of the original oscillation waveform.

During AFM measurement, the cantilever 5 oscillates while in contact with the sample. The minimum point portion of the oscillation waveform (valley bottom portion) corresponds to the timing with which the cantilever 5 reaches the lowest point and contacts the sample. By providing the phase shifter 63, a trigger pulse signal can be generated with this contact timing.

In this way, a trigger pulse signal is generated at a position on the oscillation waveform corresponding to the contact timing of the cantilever 5 with the sample. It appears that the change of phase is greatest and most marked at this contact timing. Therefore, the change of phase can be preferably detected by generating a trigger pulse with this contact timing.

However, it should be noted that, in the above description, the contact timing of the cantilever 5 and the sample should not be the precise instant of contact in the strict sense, rather, the contact timing means the instant of contact and immediately therefore/thereafter. The true instant of contact varies slightly depending on the actual phase.

Figure 6:
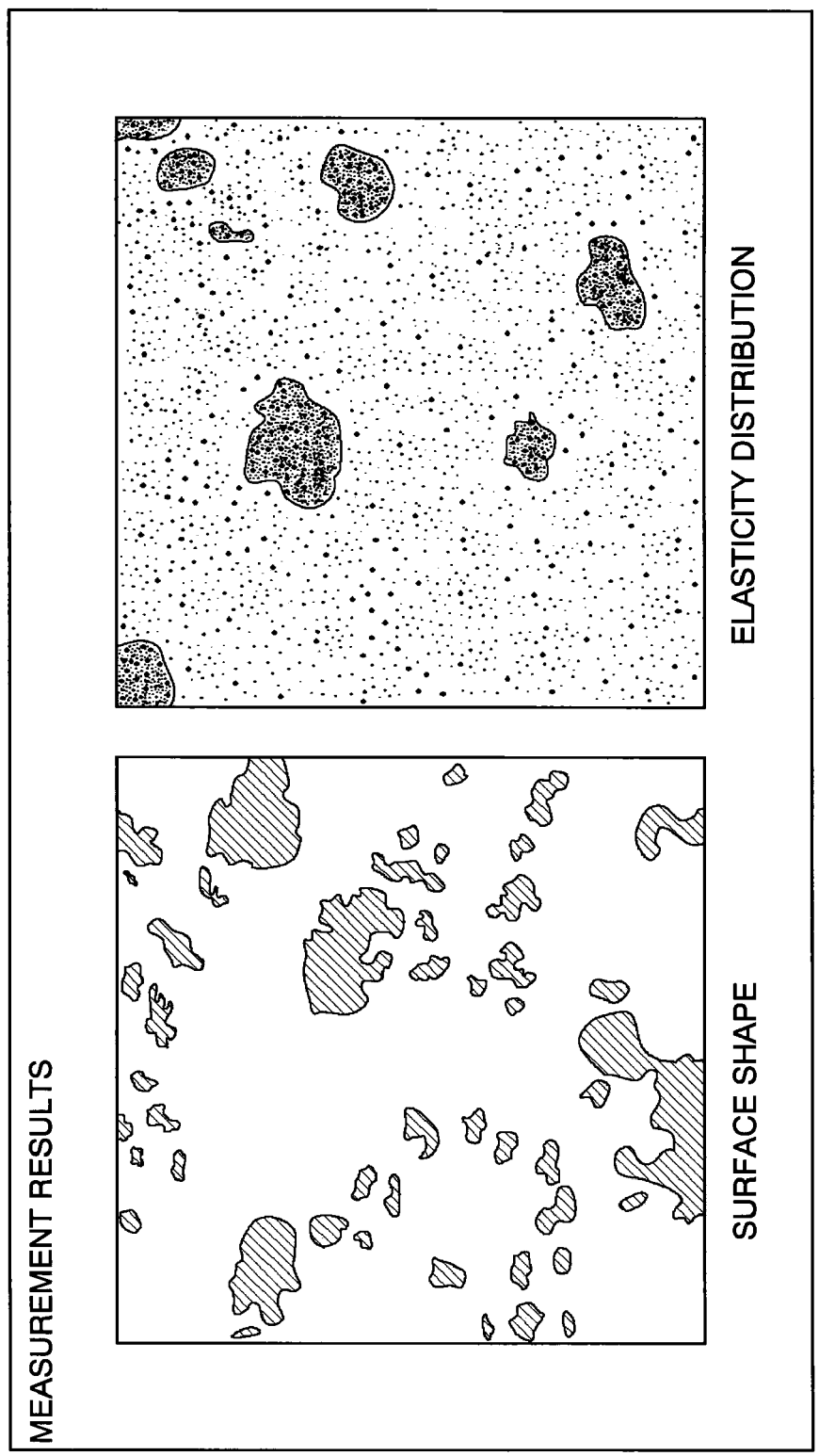
FIG. 6 shows sample shape and elasticity distribution obtained using the AFM.

FIG. 6 shows an example of an image of surface shape and the elasticity distribution obtained by an AFM 1 according to this embodiment. The sample is a polymer and measurement is conducted in liquid. The surface shape is obtained by feedback scanning using the oscillation amplitude. The elasticity distribution is an image of a phase change distribution mapping the detected phase. Change of elasticity (soft locations and hard locations) is expressed by darkness and paleness in the image.

Also, in this embodiment, as already described, the cantilever 5 is a micro cantilever and the lever size is no more than one tenth of a standard lever. Specifically, the cantilever 5 has a rectangular shape, with the length of the cantilever about 7 µm and width about 1 µm. The measurement results of FIG. 6 can suitably be obtained using such a micro cantilever.

Regarding this matter, the Q value of the cantilever becomes low in a solution environment. The Q value is a parameter indicating the sensitivity and speed of response: increasing the viscous resistance implies a lower Q value and lowering the Q value implies lower sensitivity. It was therefore conventionally believed that detection of phase change with sufficient sensitivity in solution would be difficult. In the present invention, a micro cantilever having a high resonant frequency is employed. The micro cantilever is little affected by the viscous resistance of the water. Consequently, an AFM is extremely sensitive to viscous resistance due to the interaction of the probe and the sample. Phase mapping with high sensitivity and high speed is thus made possible.

Also, in the embodiment described above, a contact AFM is mainly supposed and the present invention was applied to a contact AFM. However, the present invention may also be applied to non-contact AFMs. The non-contact AFM utilizes the interaction force which, although minute, is present between the probe and the sample even though the probe and sample are not in contact. Even this minute interaction produces slight changes in the amplitude and phase of the cantilever (phase difference between the excitation signal and the cantilever oscillation). The phase detector configuration described above may be applied to a non-contact AFM; this also applies to the other embodiments described below.

It should be noted that there are the following differences of operation between a contact AFM and a non-contact AFM. In the foregoing embodiment, the phase shifter 63 delays the phase of the oscillation waveform by an amount of ¾ of the period of the excitation signal. In this way, a trigger pulse is generated with the contact timing of the probe and sample. In the case of a non-contact AFM, a phase shifter may preferably be provided in the same way. However, in the case of a non-contact AFM, the trigger pulse is generated at closest approach of the probe and sample. These operations are identical insofar as a trigger pulse is generated with the timing at which the probe reaches the lowest point in the Z direction.

An AFM 1 according to a first embodiment of the present invention was described above. As described above, in the present invention, the phase of cantilever oscillation is detected by comparing a reference wave signal of fixed phase with a trigger pulse signal whose pulse position changes depending on the phase of the cantilever oscillation. The magnitude of the reference wave signal at the pulse position of the trigger pulse signal corresponds to the phase of the cantilever. Since the phase can be detected with a speed corresponding to the frequency of the reference wave signal, high-speed phase detection can be achieved.

Also, in the present invention, the reference wave signal has the same frequency as the excitation signal and is a signal whose phase difference with the excitation signal is fixed. The trigger pulse signal is a pulse signal that represents the position on the time axis of the oscillation waveform obtained from the displacement of the cantilever. In this way, phase detection can be achieved in each period of the cantilever, so high-speed phase detection becomes possible.

However, in the scope of the present invention, the reference wave signal may suitably have a frequency that based on the excitation signal. In principle it is also possible to make the frequencies of the excitation signal and the reference wave signal different. For example, the frequency of the reference wave signal could be half the frequency of the excitation signal.

Also, in the present invention, the trigger pulse signal is generated at a position on the oscillation waveform corresponding to the timing of contact or closest approach of the cantilever to the sample. In the case of a contact AFM, the trigger pulse is generated with the cantilever contact timing and in the case of a non-contact AFM the trigger pulse generated with the timing of closest approach of the cantilever. The trigger pulse may generated with the timing of the lowest point in the Z direction. With such timing, it is considered that the change of phase is maximum and marked, so detection of phase change can be preferably performed in the present invention.

Also, in the present invention, the reference wave signal is a sawtooth wave signal that changes monotonically in the course of a single period. The phase can preferably be detected by comparing the sawtooth wave and the trigger pulse.

Also, in the present invention, a multi-channel type oscillator generates and outputs an excitation signal and reference wave signal. A suitable reference wave signal dependent on the excitation signal can easily be generated.

Also, in the present invention, a suitable trigger pulse signal can be generated by means of the bandpass filter 61, the comparator 65 and the differentiator 67 described above, and by the phase shifter 63, and further by the AND circuit.

Also, in the present invention, a phase signal may preferably be generated by means of a sample-hold circuit as described above.

Also, in the present invention, the cantilever 5 can be a micro cantilever, thereby sensitive phase detection is possible.

Second Embodiment

Feedback Scanning and Shape Measurement Using Phase

Figure 7:
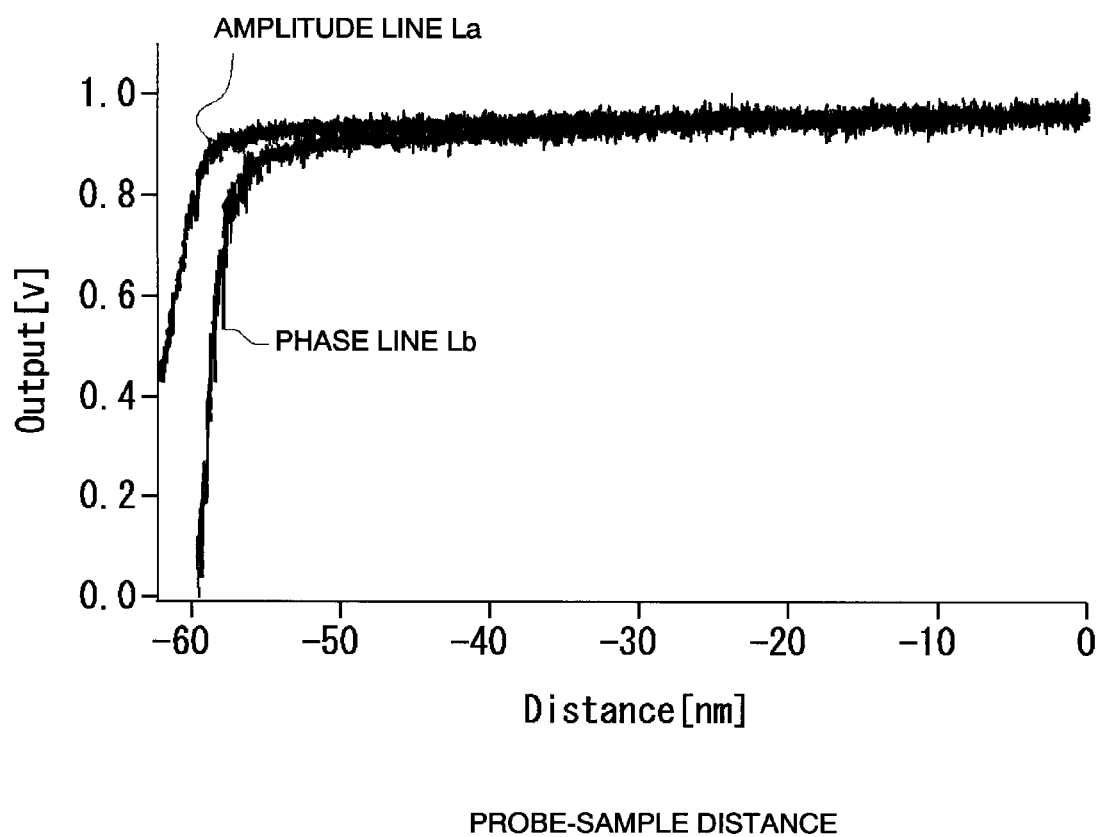
FIG. 7 shows the change of phase of cantilever oscillation with respect to probe-signal distance.

FIG. 7 is a view showing the dependence of the amplitude and phase on distance between the probe and sample. The principles of feedback scanning based on phase will be described using this figure. In FIG. 7, the horizontal axis represents the distance between the probe and sample. The amplitude line "La" in FIG. 7 is the amplitude characteristic of the cantilever oscillation and is the relationship between the probe-sample distance and the cantilever oscillation amplitude. The phase line "Lb" is the cantilever oscillation phase characteristic and is the relationship between the probe-sample distance and the cantilever oscillation phase.

FIG. 7 shows the data obtained by measurement in liquid, using the AFM 1 of FIG. 1. The cantilever 5 was a micro cantilever as described above. The oscillating cantilever 5 is moved towards the sample without performing feedback scanning in the Z direction. In this process, the amplitude data and phase data of FIG. 7 are obtained.

As shown by the amplitude line "La" of FIG. 7, the amplitude is substantially constant when the distance between the probe and sample is large. Then, when the distance between the probe and sample becomes smaller, the amplitude decreases. The amplitude line "La" corresponds to the force curve of a typical conventional cantilever. In the conventional feedback scanning, the target value of feedback is set to a value that is a little smaller than the constant value.

As shown by the phase line "Lb" of FIG. 7, when the distance between the probe and sample is large, the phase also is substantially constant. When the distance between the probe and sample becomes small, the phase becomes smaller. Feedback scanning using phase is therefore theoretically possible. Furthermore, in the present invention, the high-speed phase detection technology that is required for feedback scanning is provided by the phase detection circuit described in the embodiment explained above. Feedback scanning using phase can thereby be implemented.

Also, comparing the oscillation line "La" and amplitude line "Lb", the point where the phase starts to fall is larger than the point where the amplitude starts to fall. That is, the phase starts to fall when the probe is further from the sample. Thus the present inventors found that the phase change with respect to probe-sample distance has higher sensitivity than the amplitude change.

The phenomena of FIG. 7 are considered below. When the cantilever probe approaches the sample, the probe must try to push away water molecules in the vicinity of the sample surface and there is therefore an abrupt change in the viscous resistance in the vicinity of the sample surface. Due to this abrupt change in the viscous resistance, there is a considerable change in the phase of cantilever oscillation. It is believed that this phase change is displayed in the phase data FIG. 7. Particularly, in the present invention, a microcantilever is preferably employed. By employing a microcantilever, the adverse effects of viscous resistance are minimized. In this way, outstanding data as in FIG. 7 are obtained.

Further description will now be given concerning this phenomena. The change in phase dependent on probe-sample distance in air was previously discovered. It is believed that this known phase change is caused by repulsive force when the probe comes into contact with an object. It might have been supposed that feedback control would be possible on the basis of this known change of phase in air.

However, this known phase change is exclusively a phenomenon in gas such as air. In liquid, the Q value of the cantilever falls due to viscous resistance of the liquid. As explained above, the Q value is a parameter expressing the sensitivity and speed of response and increasing viscous resistance implies a lower Q value while a lower Q value implies lower sensitivity. The phase change sensitivity in liquid is therefore low, and it was believed that feedback control using phase change would therefore be impossible.

The present inventors employed a micro cantilever, which is much smaller than a standard cantilever, in an AFM. As described above, a microcantilever has a length of no more than 10 μm and a width of no more than 2 μm. Preferably, a microcantilever has a length of no more than 10 μm but at least 5 μm and a width of no more than 2 μm but at least 1 μm.

By employing a micro cantilever, it should be unlikely to be affected by the viscous resistance of the liquid such as water, and there is a considerable change in phase due to change of viscous resistance when the probe approaches the sample. It is believed that this change of phase occurs due to the force required for pushing away the water molecules. Thus this change of phase in liquid is produced by a phenomenon different from phase change in air. It is believed that this phase change can be detected with higher sensitivity than change of amplitude.

The relationship between the sample-to-probe distance and the phase of the cantilever oscillation was described in detail above with reference to FIG. 7. As described above, as shown in FIG. 7, the phase characteristic describes a line of shape similar to that of the amplitude characteristic, so phase can be employed for feedback scanning in the same way as amplitude. In addition to this, the phase sensitivity is greater than the amplitude sensitivity. Furthermore, high-speed detection such as is required for feedback scanning can be achieved by the phase detection circuit of the present invention. Consequently, feedback scanning based on phase can be performed with high sensitivity and high speed by utilizing high-speed phase detection according to the present invention.

Accordingly, the present embodiment provides an AFM that performs feedback scanning and shape measurement using phase. The principles of feedback scanning may be the same as in the case of scanning using amplitude, except for the fact that the subject of control is phase rather than amplitude.

Figure 8:
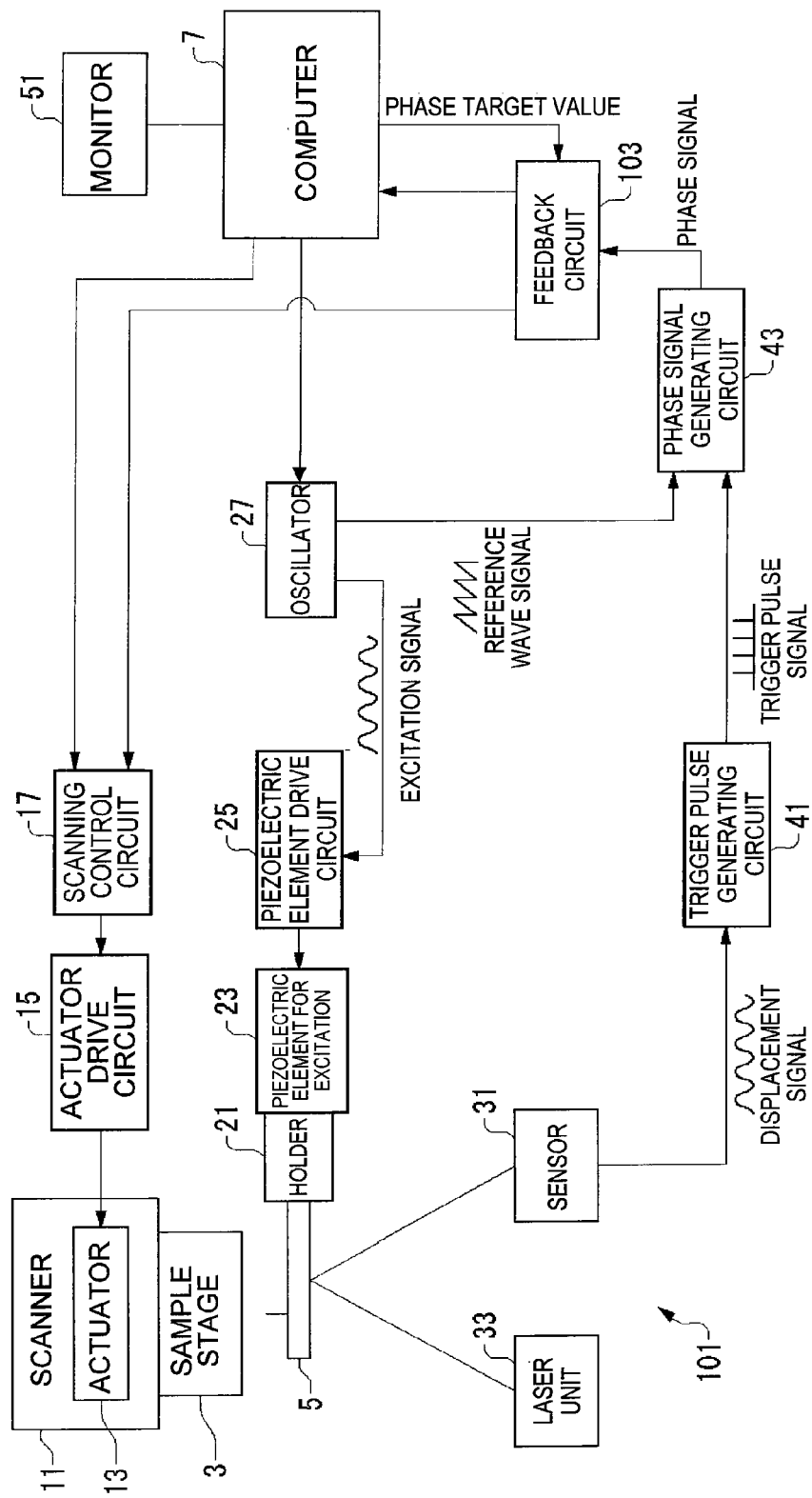
FIG. 8 shows an AFM according to a second embodiment of the present invention.

FIG. 8 is a block diagram showing an AFM configuration according to this embodiment. As shown in the figure, an AFM 101 comprises a feedback circuit 103 that receives a phase signal from a phase signal generating circuit 43. Feedback scanning is not performed using oscillation amplitude, so no amplitude detection circuit is shown (however, an amplitude detection circuit could be provided).

The feedback circuit 103 is inputted with a phase target value from the computer 7. The phase target value is a target value for the phase. The phase target value corresponds to the amplitude target value in conventional feedback scanning. In principle, the phase target value is generated using the data of the characteristic of FIG. 7. The phase target value is set to a value that is a little smaller than the constant value of the phase. The constant value corresponds to the phase during free oscillation. For example, the phase target value may be set to 0.9 times the constant value.

The feedback circuit 103 generates a feedback signal dependent on the difference between the detected phase and the phase target value. The feedback circuit 37 comprises for example a subtractor that generates a deviation signal by subtracting the phase target value from the detected phase value and a PID circuit that amplifies the deviation signal, whereby the feedback signal is generated using these structural elements.

The feedback signal is supplied to a scanning control circuit 17, where it is utilized for feedback scanning. In an XY scanning step, the scanning control circuit 17 controls an actuator drive circuit 15 in accordance with this feedback signal such that the detected phase value and the phase target value coincide. The distance between the cantilever 5 and the sample is maintained constant by means of this feedback control.

XY scanning is performed while performing Z scanning in which the distance between the cantilever 5 and the sample is maintained constant. The feedback signal of the Z scanning is also supplied to the computer 7 from the feedback circuit 103 and is used in processing to generate a sample image. The feedback signal corresponds to the height of the sample in the Z direction. Also, the position of the sample in the XY direction is specified by the control signal for XY scanning that is generated by the computer 7 and supplied to the scanning control circuit 17. The computer 7 generates an image of the sample surface using the control data for XY scanning and the feedback signal that is input thereto, and displays this image on the monitor 51. Preferably, a three-dimensional image is generated and displayed.

A second embodiment of the present invention was described above. In the present invention, the sample and the cantilever 5 are relatively scanned in the Z direction such that the phase signal is constant. Also, in the present invention, the position of the sample in the Z direction is specified from the signal for controlling the phase signal to be constant, and the shape of the sample is thereby determined. The Z direction is the direction of surface unevenness of the sample (more specifically, the height direction of surface unevenness), and the position of the sample in the Z direction expresses the height of the unevenness. In this way, feedback scanning is performed and, in addition, shape measurement is performed, by using the phase change dependent on the distance between the cantilever and sample. The phase can be detected at high speed, so feedback scanning can preferably be implemented using phase, and shape measurement can also be preferably performed.

Phase detection of the present invention is extremely rapid and phase detection can be achieved at even higher speed than amplitude detection. More specifically, it is known that the resolution of amplitude detection cannot be raised above ⅛ of the resonant frequency of the cantilever. In contrast, in the case of phase detection in the present invention, detection can be performed in each period of the cantilever. This rapidity of phase detection can increase speed of feedback scanning and shape measurement and improve resolution.

Also, in the present invention, specifically, a micro cantilever is employed. As shown in FIG. 7, use of a micro cantilever provides a preferable response of the phase to the probe-sample distance and high phase sensitivity, therefore, the phase sensitivity is rather higher than the amplitude sensitivity. Moreover, measurement with this high sensitivity can be satisfactorily performed even in liquid. Furthermore, measurement can be conducted with the cantilever arranged at a greater distance from the sample, measurement can therefore be achieved with a lower load i.e. measurement can be conducted under a condition of weak interaction of the probe and sample. Damage to the sample can be reduced and measurement of softer samples or measurement of weaker samples can be achieved.

Third Embodiment

Multi-Point Phase Detection

Next, a third embodiment of the present invention will be described. This embodiment is a further application of the embodiment described above. In the embodiments described up to this point, a single trigger pulse signal was generated during a single period of the reference wave signal. In the present embodiment, a plurality of mutually offset trigger pulse signals are generated during a single period of the reference wave signal. The phase signal is then generated from each of this plurality of trigger pulse signals. The number of phase detection points (timings) can thereby be increased.

Figure 9:
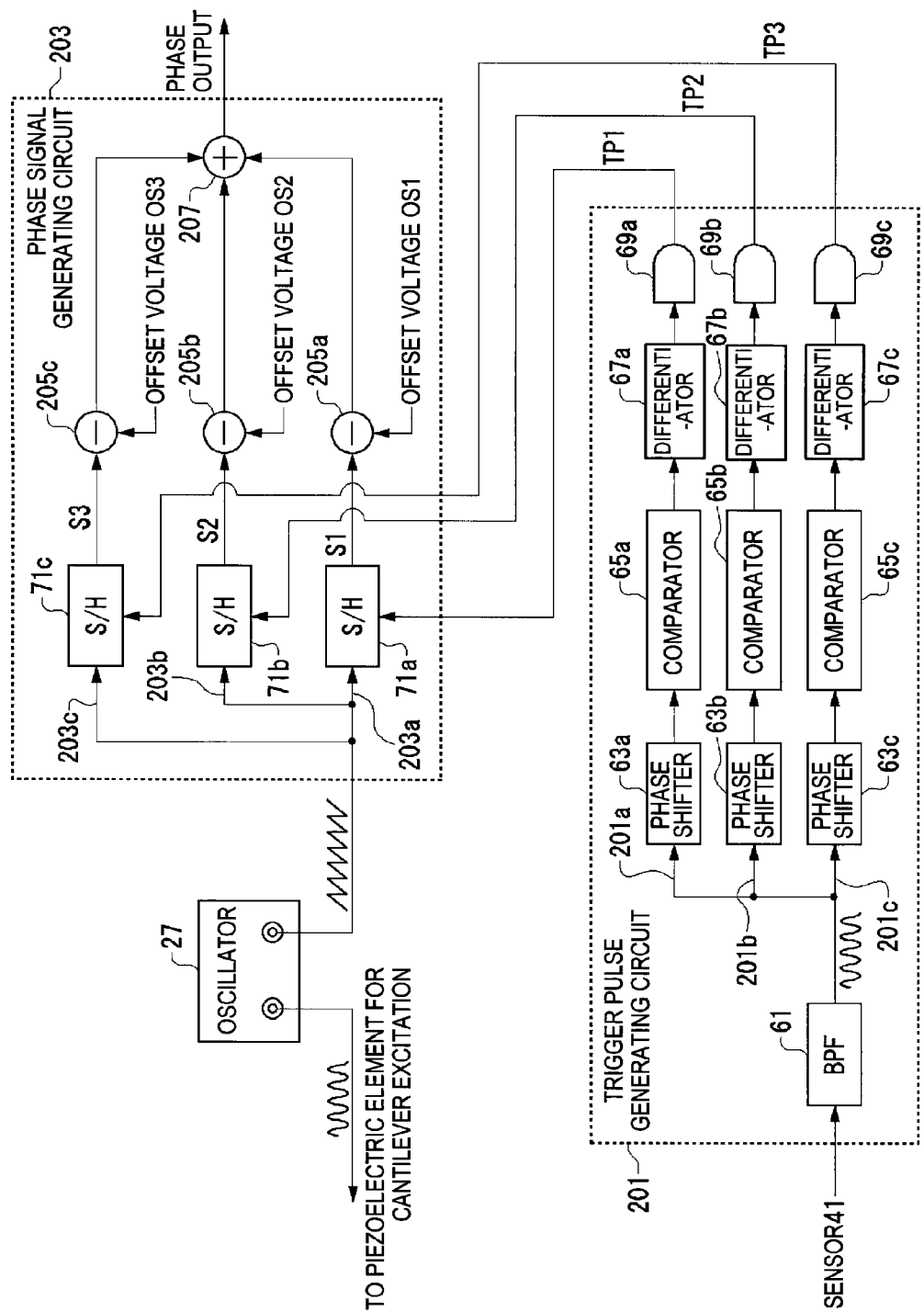
FIG. 9 shows an AFM according to a third embodiment of the present invention.

FIG. 9 shows the portion of the phase detection circuit in an AFM according to this embodiment. The configuration of FIG. 9 is suitably provided in the AFM 101 of FIG. 8. In this case, the trigger pulse generating circuit 41 of FIG. 8 is replaced by the trigger pulse generating circuit 201 of FIG. 9 and the phase signal generating circuit 43 of FIG. 8 is replaced by the phase signal generating circuit 203 of FIG. 9. The rest of the configuration may be the same as in FIG. 8. By means of such a configuration, the number of phase detection points in feedback scanning using phase is increased, and it becomes possible to increase the bandwidth of feedback scanning.

As shown in FIG. 9, in the trigger pulse generating circuit 201, the output of a bandpass filter 61 is branched to three paths, namely, 201*a*, 201*b*, 201*c*. In the path 201*a*, there are successively provided a phase shifter 63*a*, a comparator 65*a*, a differentiator 67*a* and an AND circuit 69*a*. Likewise, in the path 201*b*, there are provided a phase shifter 63*b*, a comparator 65*b*, a differentiator 67*b* and an AND circuit 69*b*. Furthermore, in the path 201*c*, there are provided a phase shifter 63*c*, a comparator 65*c*, a differentiator 67*c* and an AND circuit 69*c*. The function of these elements is the same as that of the corresponding configurations in FIG. 4 (the phase shifter 63, the comparator 65, the differentiator 67 and the AND circuit 69).

Consequently, the trigger pulse generating circuit 201 of FIG. 9 corresponds to a configuration in which there are provided three trigger pulse generating circuits 41 of FIG. 8 or FIG. 4 and three trigger pulse signals are thereby generated and output from the AND circuits 69*a*, 69*b*, 69*c*.

However, in the trigger pulse generating circuit 201 of FIG. 9, the amounts of phase offset produced by the three phase shifters 63*a*, 63*b*, 63*c* are different. In the same way as in the embodiment described above, the first phase shifter 63*a* is delayed in phase by ¾ (270°) of the excitation period. The phase shifter 63*b* is delayed in phase by a further 90° from the phase shifter 63*a* (that is, delay of one period). The phase shifter 63*c* is delayed in phase by a further 90° from the phase shifter 63*b* (that is, delay of 5/4 periods). In this embodiment, therefore, two trigger pulse signals are generated at positions that are offset by 90° in each case after the trigger pulse signal that was generated in the embodiment described above (in fact, furthermore, the phase change component is included in the pulse position; likewise in the present specification). Hereinbelow, the trigger pulse signals that are generated by the paths 201*a*, 201*b*, 201*c* are referred to as the trigger pulse signals TP1, TP2, TP3.

The phase signal generating circuit 203 comprises three sample-hold circuits 71*a*, 71*b*, 71*c* and three subtractors 205*a*, 205*b*, 205*c*, and an adder 207.

The output of the oscillator 27 is branched to three paths 203*a*, 203*b*, 203*c* and respective sample-hold circuits 71*a*, 71*b*, 71*c* are connected with the three paths 203*a*, 203*b*, 203*c*. The sample-hold circuits 71*a*, 71*b*, 71*c* function in the same way as the sample-hold circuit 71 of FIG. 4.

Subtractors 205*a*, 205*b*, 205*c* are connected with the sample-hold circuits 71*a*, 71*b*, 71*c*. The subtractors 205*a*, 205*b*, 205*c* function as offset adjusters that respectively subtract offset voltages OS1, OS2, OS3 from the outputs of the sample-hold circuits 71*a*, 71*b*, 71*c*. The offset voltages OS1, OS2, OS3 are input from the computer 7.

The subtractors 205*a*, 205*b*, 205*c* are connected with the adder 207 and the adder 207 is connected with the feedback circuit 103 and the computer 7 shown in FIG. 8.

Next, the operation of the phase detector in this embodiment will be described with reference to FIG. 9 and FIG. 10. However, a detailed description of items that have already been explained with reference to the embodiments described above is omitted.

The bandpass filter 61 extracts an oscillation waveform signal of the component of the excitation frequency from the displacement signal of the sensor 31. This oscillation waveform is supplied to the three paths 201a, 201b, 201c and the three trigger pulse signals TP1, TP2, TP3 are thereby generated.

Figure 10:
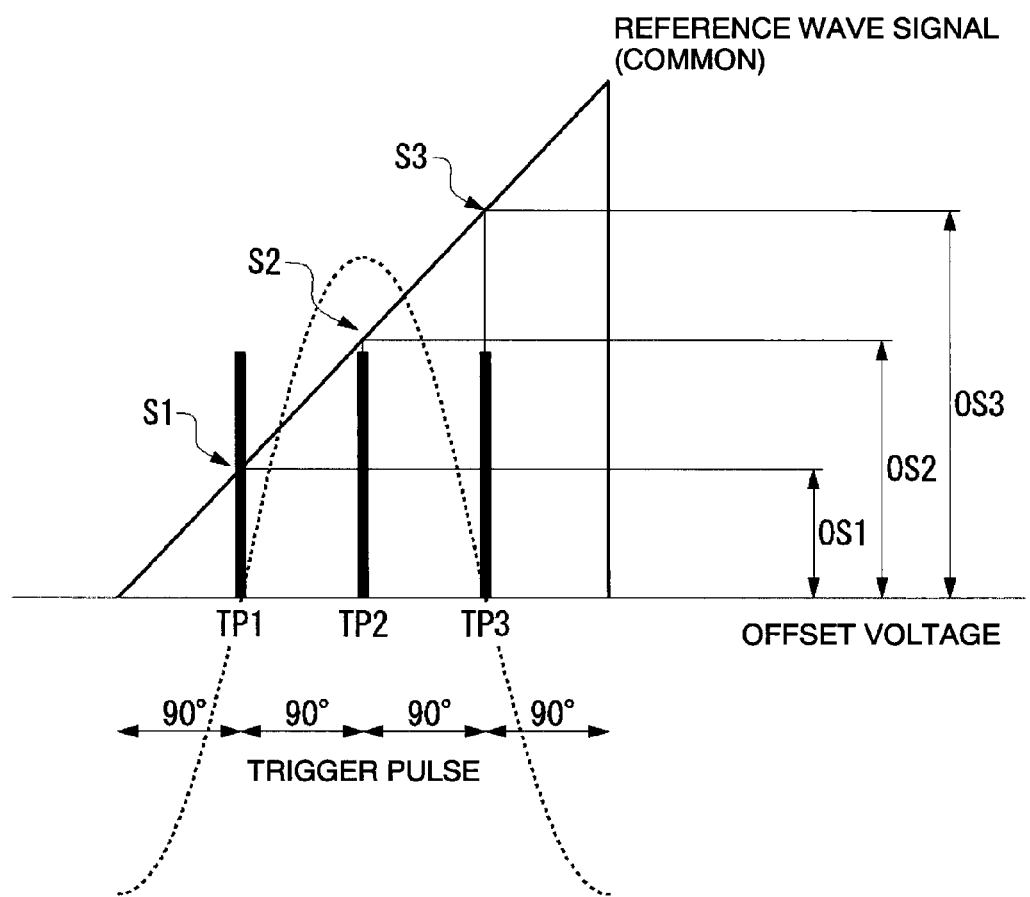
FIG. 10 shows phase detection using an AFM according to the third embodiment of the present invention.

Since the amount of mutual phase offset of the phase shifters 63a, 63b, 63c is 90°, as shown in FIG. 10, there is a phase offset of 90° of the generating points between the trigger pulse signals TP1, TP2, TP3. That is, the trigger pulse signals TP1, TP2, TP3 are generated at positions that are offset by 90° on the original oscillation waveform of the cantilever 5.

The trigger pulse signals TP1, TP2, TP3 are output from the AND circuits 69a, 69b, 69c and input to the sample-hold circuits 71a, 71b, 71c. A common reference wave signal is input from the oscillator 27 to the sample-hold circuits 71a, 71b, 71c. The phase of the reference wave signal is adjusted as shown in FIG. 10, and is fixed in the position of FIG. 10. The sample-hold circuits 71a, 71b, 71c then generate phase signals S1, S2, S3 from the reference wave signal with the timings of the respective trigger pulse signals TP1, TP2, TP3.

The phase signal is input to the subtractors 205a, 205b, 205c from the sample-hold circuits 71a, 71b, 71. In the subtractors 205a, 205b, 205c, the offset voltages OS1, OS2, OS3 shown in FIG. 10 are subtracted from the phase signals S1, S2, S3. The offset voltage OS2 is larger than the offset voltage OS1 by a value corresponding to 90° of the reference wave signal, and the offset voltage OS3 is larger than the offset voltage OS2 by a value corresponding to 90° of the reference wave signal. This offset processing can therefore cancel out the differences of the phase signals S1, S2, S3 produced by offsetting the positions of the trigger pulses, thereby it is possible to isolate a signal corresponding to a minute change of the pulse position dependent on the phase change of oscillation.

The phase signals S1, S2, S3 after offset adjustment are input to the adder 207 from the subtractors 205a, 205b, 205c and are added by the adder 207. The output of the adder 207 is then supplied to the feedback circuit 103 and computer 7 as the output of the phase signal generating circuit 203.

Thus, in this embodiment, the number of phase detection points can be increased, therefore the number of detection points for feedback scanning can be increased. This embodiment is advantageous as described below compared with conventional feedback scanning using amplitude.

The cantilever amplitude only changes when the probe comes into contact with the sample. Furthermore, it is known that the theoretical maximum resolution of amplitude detection is ⅛ of the resonant frequency of the cantilever. In contrast, the cantilever phase changes even when the probe is not in contact with the sample. That is, the cantilever phase changes even before and after contact between the probe and the sample. This feature is utilized in the present invention. Namely, a plurality of mutually offset trigger pulses are generated, so that a plurality of phase detection points are provided in a single period of the cantilever oscillation, and the phase detected at these phase detection points is employed for feedback scanning. Compared with the conventional amplitude detection, the number of detection points can therefore be greatly increased, making possible increased bandwidth in feedback scanning.

In the embodiment described above, three trigger pulses were generated during a single period. However, the present invention is not restricted to this. Two trigger pulses could be generated or four or more trigger pulses could be generated.

Also, in the above description, the phase detector of this embodiment was applied to an AFM according to the second embodiment shown in FIG. 8 and the phase signal was employed for feedback scanning. However, the phase detector of this embodiment could also be applied to the AFM according to the first embodiment shown in FIG. 1. In this case, the circuit configuration of FIG. 9 is provided by altering the circuit of FIG. 4. Namely, the phase signal is input to the computer 7, where phase mapping is performed, and an image showing the phase change distribution (elasticity distribution) is thereby generated.

A third embodiment of the present invention was described above. In the present invention, a plurality of mutually offset trigger pulses are generated during a single period of the reference wave signal, and respective phase signals are generated from this plurality of trigger pulse signals. The number of phase detection points can be increased and high-speed detection can be achieved.

In the present invention, a plurality of sample-hold circuits are provided, and a plurality of trigger pulse signals are respectively input to this plurality of sample-hold circuits. In this way, the number of phase detection points can be preferably increased.

In the present invention, offset adjustment is performed to the plurality of phase signals generated by the plurality of sample-hold circuits depending on the deviation of the plurality of trigger pulse signals. This offset adjustment eliminates the deviation of the three phase signals caused by employment of a common reference wave signal. Phase signals of a plurality of detection points can be preferably carried out by such offset adjustment which is a comparatively simple circuit configuration.

Fourth Embodiment

Multi-Point Phase Detection

Next, a fourth embodiment of the present invention will be described. This fourth embodiment is a modified example of the third embodiment described above. In the third embodiment, three phase signals were generated from a single common reference wave signal, and offset adjustment of these three phase signals was then performed. In the fourth embodiment, three reference wave signals whose phase is offset are provided beforehand, and three phase signals are generated from the three reference wave signals and the three trigger pulses.

Figure 11:
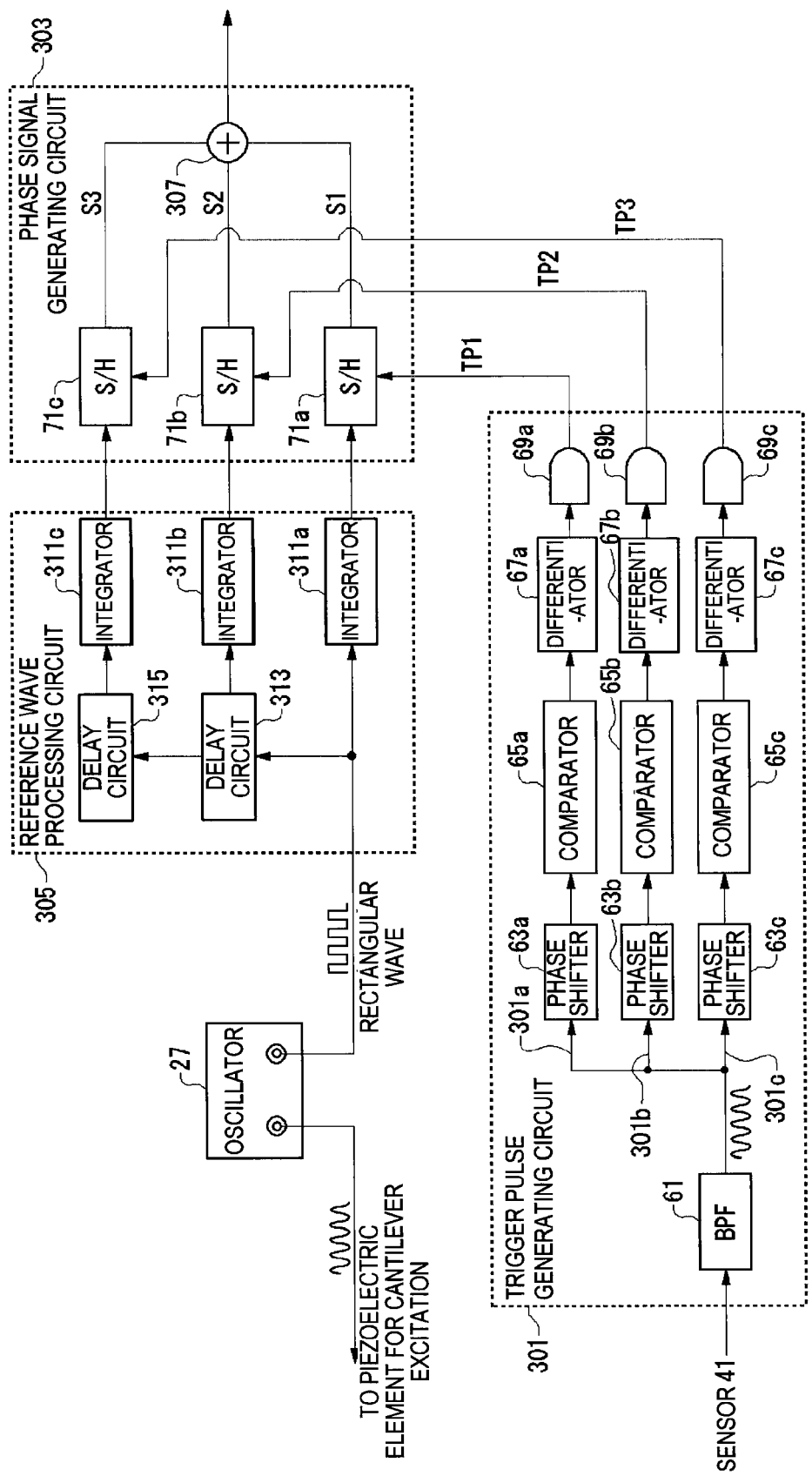
FIG. 11 shows an AFM according to a fourth embodiment of the present invention.

FIG. 11 shows the portion of the phase detection circuit in the AFM according to this embodiment. As shown in FIG. 11, the phase detection circuit of this embodiment comprises an oscillator 27, a trigger pulse generating circuit 301, a phase signal generating circuit 303, and a reference wave processing circuit 305. The trigger pulse generating circuit 301 has the same as the trigger pulse generating circuit 201 of FIG. 9.

The phase signal generating circuit 303, like the phase signal generating circuit 203 of FIG. 9, comprises three sample-hold circuits 71a, 71b, 71c. However, the subtractors 205a, 205b, 205c constituting the offset adjusters are eliminated, and the sample-hold circuits 71a, 71b, 71c are connected with the adder 307 without passing through the subtractors.

A reference wave processing circuit 305 is provided between an oscillator 27 and a phase signal generating circuit 303. The reference wave processing circuit 305 comprises three integrators 311a, 311b, 311c and two delay circuits 313, 315. The oscillator 27 is connected with the integrator 311a and the delay circuit 313; the delay circuit 313 is connected with the integrator 311b and the delay circuit 315; and the delay circuit 315 is connected with the integrator 311c. The integrators 311a, 311b, 311c are connected with the respective sample-hold circuits 71a, 71b, 71c.

Consequently, the integrator 311a is arranged between the oscillator 27 and the sample-hold circuit 71a. Also, the delay circuit 313 and the integrator 311b are arranged between the oscillator 27 and the sample-hold circuit 71b. Furthermore, the delay circuits 313, 315 and integrator 311c are arranged between the oscillator 27 and sample-hold circuit 71c.

The reference wave processing circuit 305 functions as part of the reference wave generating means or circuit. That is, the reference wave processing circuit 305 together with the oscillator 27 configurates the reference wave generating means or circuit. The reference wave signal of the oscillator 27 is processed by the reference wave processing circuit 305 and the reference wave signal after processing is input to the three sample-hold circuits 71a, 71b, 71c of the phase signal generating circuit 303.

Next, the operation of the phase detector in this embodiment will be described with reference to FIG. 11 and FIG. 12. It should be noted that a detailed description of items that have already been explained in the embodiments described above is omitted.

The trigger pulse generating circuit 301 generates three trigger pulse signals TP1, TP2, TP3 that are mutually offset by 90° in each case from the displacement signal of the sensor 41. The trigger pulse signals TP1, TP2, TP3 are respectively input to the sample-hold circuits 71a, 71b, 71c of the phase signal generating circuit 303.

The oscillator 27 supplies a reference wave signal comprising a rectangular wave to the reference wave processing circuit 305. In the previous embodiments, the reference wave signal was a sawtooth wave. In this embodiment, the reference wave signal is a rectangular wave. However, although the waveform is different, just as in the case of the previous embodiments, the frequency of the reference wave signal is the same as that of the cantilever excitation signal, and the phase difference of the reference wave signal and the excitation signal is fixed.

The reference wave signal is input to the sample-hold circuit 71a from the oscillator 27 through the integrator 311a. The integrator 311a converts the rectangular wave signal to a sawtooth wave signal. Consequently, the sample-hold circuit 71a acquires a sawtooth wave reference wave signal just as in the case of the previous embodiments.

Also, the reference wave signal is input to the sample-hold circuit 71b from the oscillator 27 through the delay circuit 313 and integrator 311b. In addition, the reference wave signal is input to the sample-hold circuit 71c from the oscillator 27 through the delay circuits 313, 315 and the integrator 311c. The result of the action of the integrators 311b, 311c, the sample-hold circuits 71b, 71c also acquire reference wave signals consisting of sawtooth waves. However, because the delay circuits 313, 315 are provided, the phases of the reference wave signals are delayed compared with the reference wave signal to the sample-hold circuit 71a.

The amount of delay of the delay circuit 313 is set to be equal to the amount of offset between the trigger pulses TP1 and TP2, specifically, it is set to 90° (¼ period). Also, the amount of delay of the delay circuit 315 is set to be equal to the amount of offset between the trigger pulses TP2, TP3, specifically, it is set to be 90° (¼ period).

Figure 12:
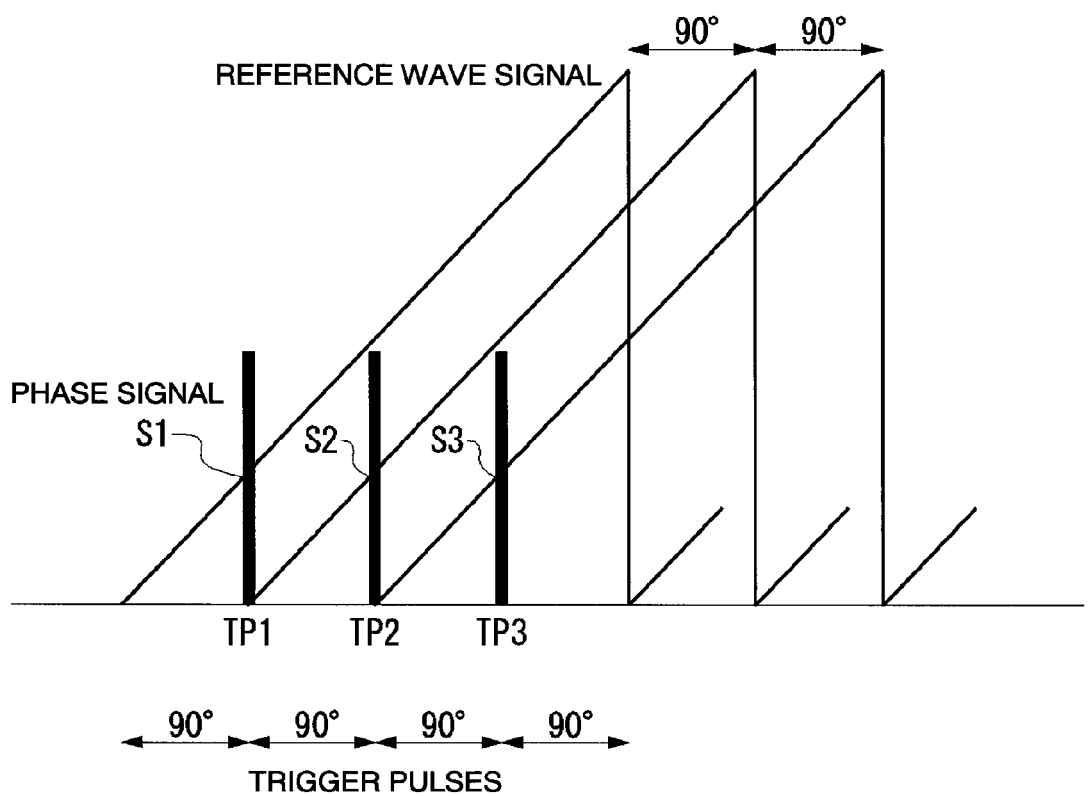
FIG. 12 shows phase detection using an AFM according to the fourth embodiment of the present invention.

Consequently, as shown in FIG. 12, the sample-hold circuits 71a, 71b, 71c respectively acquire three reference wave signals that are mutually offset by the same offset amount as the mutually offset trigger pulses TP1, TP2, TP3. The sample-hold circuits 71a, 71b, 71c generate three phase signals S1, S2, S3 from these three trigger pulses TP1, TP2, TP3 and the three mutually offset reference wave signals. Since three previously offset reference wave signals are employed, offset adjustment of the phase signals S1, S2, S3 is unnecessary. The phase signals S1, S2, S3 are then supplied to the adder 307, added by the adder 307 and output as a phase signal.

When the configuration of FIG. 11 is employed in feedback scanning, the phase signal is supplied to the feedback circuit from the adder 307. Also, if the configuration of FIG. 11 is applied to phase mapping, the phase signal may suitably be supplied to the computer for image processing.

A fourth embodiment of the present invention was described above. In this embodiment also, a plurality of mutually offset trigger pulse signals are generated during a single period of the reference wave signal, and the phase signal is generated from each of the plurality of trigger pulse signals. In this way, the number of phase detection points can be further increased, and high-speed detection can be achieved.

Also, in this embodiment, a plurality of sample-hold circuits are provided, and a plurality of trigger pulse signals are respectively input to this plurality of sample-hold circuits. In this way, the number of phase detection points can be suitably increased.

Also, in this embodiment, a plurality of reference wave signals are generated that are mutually offset dependent on the offset of the trigger pulse signals. This plurality of reference wave signals are respectively input to the plurality of sample-hold circuits together with the plurality of trigger pulse signals. In this way, the number of phase detection points can be suitably increased in this embodiment also.

Various suitable embodiments of the present invention have been described above. However, the present invention is not limited to the embodiments described above.

For example, in these embodiments, the sample was held at the undersurface of the sample stage. However, the sample could be held at the upper surface of the sample stage. Also, the cantilever need not be made of silicon nitride.

Also, in these embodiment, oscillation of the cantilever 5 was excited by means of a piezo element (piezoelectric element). However, the method of this embodiment does not depend on the method of exciting the cantilever. Oscillation of the cantilever 5 could be excited by a configuration other than a piezo element. For example, oscillation of the cantilever 5 could be excited by light. Also, oscillation of a magnetized cantilever could be excited by an alternating magnetic field. In the case where light is employed, laser light for excitation is irradiated onto the cantilever 5 and the cantilever 5 is deformed by heat. The laser light intensity oscillates periodically and thereby the cantilever 5 oscillates.

Also, as already described, the present invention could be applied to a contact AFM or non-contact AFM.

While the preferable embodiments of the present invention which are possible at present have been explained, it should be understood that a number of modifications to the present embodiments can be made, and it is intended that such modifications within the true spirit and scope of the present invention are also included in the scope of the appended claim.

INDUSTRIAL APPLICABILITY

The scanning probe microscope according to the present invention can be applied for example to observation of nano functional changes of the molecules of living organisms.

The invention claimed is:

1. A scanning probe microscope for oscillating a cantilever and performing relative scanning between said cantilever and a sample, comprising:
   exciting means for exciting said cantilever;
   a sensor for detecting displacement of said cantilever;
   reference wave generating means for generating a reference wave signal that has a frequency based on an excitation signal of said cantilever and is of fixed phase difference with respect to said excitation signal;
   trigger pulse generating means for generating a trigger pulse signal whose pulse position changes dependent on the phase of oscillation of said cantilever, on the basis of the displacement of said cantilever; and
   phase signal generating means for generating a signal dependent on the magnitude of said reference wave signal at said pulse position as a phase signal of said cantilever oscillation, on the basis of said reference wave signal and said trigger pulse signal;
   wherein said reference wave generating means generates a signal having the same frequency as said excitation signal and of fixed phase difference with respect to said excitation signal as said reference wave signal;
   wherein said trigger pulse generating means generates, as said trigger pulse signal, a pulse signal that expresses the position on a time axis of an oscillation waveform obtained from the displacement of said cantilever; and
   wherein said trigger pulse generating means generates said trigger pulse signal at a position on the oscillation waveform corresponding to the timing of contact or closest approach of said cantilever to said sample.

2. A scanning probe microscope for oscillating a cantilever and performing relative scanning between said cantilever and a sample, comprising:
   exciting means for exciting said cantilever;
   a sensor for detecting displacement of said cantilever;
   reference wave generating means for generating a reference wave signal that has a frequency based on an excitation signal of said cantilever and is of fixed phase difference with respect to said excitation signal;
   trigger pulse generating means for generating a trigger pulse signal whose pulse position changes dependent on the phase of oscillation of said cantilever, on the basis of the displacement of said cantilever; and
   phase signal generating means for generating a signal dependent on the magnitude of said reference wave signal at said pulse position as a phase signal of said cantilever oscillation, on the basis of said reference wave signal and said trigger pulse signal;
   wherein said trigger pulse generating means includes:
   a bandpass filter for extracting an oscillation waveform signal of a frequency component of said excitation signal from a displacement signal of said cantilever;
   a comparator for converting said oscillation waveform signal to a rectangular wave signal; and
   a differentiator for generating a pulse signal at the rectangular wave generation timing from said rectangular wave signal.

3. A scanning probe microscope for oscillating a cantilever and performing relative scanning between said cantilever and a sample, comprising:
   exciting means for exciting said cantilever;
   a sensor for detecting displacement of said cantilever;
   reference wave generating means for generating a reference wave signal that has a frequency based on an excitation signal of said cantilever and is of fixed phase difference with respect to said excitation signal;
   trigger pulse generating means for generating a trigger pulse signal whose pulse position changes dependent on the phase of oscillation of said cantilever, on the basis of the displacement of said cantilever; and
   phase signal generating means for generating a signal dependent on the magnitude of said reference wave signal at said pulse position as a phase signal of said cantilever oscillation, on the basis of said reference wave signal and said trigger pulse signal;
   wherein said cantilever has a length of no more than 10 μm and a width of no more than 2 μm.

4. A scanning probe microscope for oscillating a cantilever and performing relative scanning between said cantilever and a sample, comprising:
   exciting means for exciting said cantilever;
   a sensor for detecting displacement of said cantilever;
   reference wave generating means for generating a reference wave signal that has a frequency based on an excitation signal of said cantilever and is of fixed phase difference with respect to said excitation signal;
   trigger pulse generating means for generating a trigger pulse signal whose pulse position changes dependent on the phase of oscillation of said cantilever, on the basis of the displacement of said cantilever; and
   phase signal generating means for generating a signal dependent on the magnitude of said reference wave signal at said pulse position as a phase signal of said cantilever oscillation, on the basis of said reference wave signal and said trigger pulse signal;
   wherein said scanning probe microscope performs scanning said sample and said cantilever relatively in the Z direction such that the phase signal generated by said phase signal generating means is constant.

5. The scanning probe microscope according to claim 4, wherein said scanning probe microscope determines the shape of said sample by specifying the position of said sample in the Z direction from the signal for controlling said phase signal to be constant.

6. A scanning probe microscope for oscillating a cantilever and performing relative scanning between said cantilever and a sample, comprising:
   exciting means for exciting said cantilever;
   a sensor for detecting displacement of said cantilever;
   reference wave generating means for generating a reference wave signal that has a frequency based on an excitation signal of said cantilever and is of fixed phase difference with respect to said excitation signal;
   trigger pulse generating means for generating a trigger pulse signal whose pulse position changes dependent on the phase of oscillation of said cantilever, on the basis of the displacement of said cantilever; and
   phase signal generating means for generating a signal dependent on the magnitude of said reference wave signal at said pulse position as a phase signal of said cantilever oscillation, on the basis of said reference wave signal and said trigger pulse signal;
   wherein said trigger pulse generating means generates a plurality of trigger pulse signals that are mutually offset in one period of said reference wave signal; and
   said phase signal generating means generates said phase signal from each of said plurality of trigger pulse signals.

7. The scanning probe microscope according to claim 6, wherein said phase signal generating means includes a plurality of sample-hold circuits that hold said reference wave signal using said trigger pulse signals as sampling timing, and said plurality of trigger pulse signals are respectively input to said plurality of sample-hold circuits.

8. The scanning probe microscope according to claim 7, comprising: means for offsetting a plurality of phase signals generated by said plurality of sample-hold circuits dependent on the offset of said plurality of trigger pulse signals.

9. The scanning probe microscope according to claim 7, comprising: means for generating a plurality of reference wave signals that are mutually offset dependent on the offset of said trigger pulse signals, and said plurality of reference wave signals are respectively input together with said plurality of trigger pulse signals to said plurality of sample-hold circuits.

* * * * *